United States Patent
Teranishi et al.

(10) Patent No.: US 10,747,377 B2
(45) Date of Patent: Aug. 18, 2020

(54) DISPLAY DEVICE WITH TOUCH DETECTION IN PERIPHERAL REGION

(71) Applicant: Japan Display Inc., Tokyo (JP)

(72) Inventors: Yasuyuki Teranishi, Tokyo (JP); Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 7 days.

(21) Appl. No.: 15/936,939

(22) Filed: Mar. 27, 2018

(65) Prior Publication Data

US 2018/0284922 A1    Oct. 4, 2018

(30) Foreign Application Priority Data

Mar. 29, 2017    (JP) ................. 2017-064838

(51) Int. Cl.
*G06F 3/044* (2006.01)
*G06F 3/047* (2006.01)
*G06F 3/041* (2006.01)

(52) U.S. Cl.
CPC ............. *G06F 3/044* (2013.01); *G06F 3/047* (2013.01); *G06F 3/0412* (2013.01); *G06F 3/0416* (2013.01); *G06F 2203/04103* (2013.01)

(58) Field of Classification Search
CPC .................................................... G06F 3/044
See application file for complete search history.

(56) References Cited

U.S. PATENT DOCUMENTS

| | | | |
|---|---|---|---|
| 2010/0073319 A1* | 3/2010 | Lyon | G06F 3/044 345/174 |
| 2010/0182273 A1* | 7/2010 | Noguchi | G02F 1/13338 345/174 |
| 2014/0362042 A1* | 12/2014 | Noguchi | G06F 3/0412 345/174 |
| 2015/0346881 A1* | 12/2015 | Watazu | G01L 1/16 345/174 |
| 2016/0124563 A1* | 5/2016 | Wang | G06F 3/0416 345/174 |
| 2016/0202829 A1 | 7/2016 | Choi et al. | |
| 2016/0216802 A1* | 7/2016 | Bao | G06F 3/0412 |
| 2016/0282976 A1* | 9/2016 | Yang | G06F 3/044 |
| 2017/0262112 A1* | 9/2017 | Noguchi | G06F 3/044 |
| 2018/0260069 A1* | 9/2018 | Suzuki | G06F 3/0416 |

* cited by examiner

*Primary Examiner* — William Boddie
*Assistant Examiner* — Andrew B Schnirel
(74) *Attorney, Agent, or Firm* — K&L Gates LLP

(57) ABSTRACT

A display device includes a substrate, first electrodes, second electrodes, and a driver. The first electrodes are disposed in a matrix (row-column configuration) in a display region of the substrate. The second electrodes are disposed in a peripheral region on the outside of the display region of the substrate. The driver supplies a drive signal to the first electrodes and the second electrodes. The first electrodes output detection signals corresponding to self-capacitance changes in the first electrodes. The second electrodes output detection signals corresponding to self-capacitance changes in the second electrodes.

17 Claims, 33 Drawing Sheets

DISPLAY DEVICE WITH TOUCH DETECTION IN PERIPHERAL REGION

CROSS-REFERENCE TO RELATED APPLICATIONS

This application claims priority from Japanese Application No. 2017-064838, filed on Mar. 29, 2017, the contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function. The touch screen panel described in U.S. Unexamined Patent Application Publication No. 2016/0202829, for example, includes a plurality of detection electrodes formed in a matrix (row-column configuration). The touch screen panel described in U.S. Unexamined Patent Application Publication No. 2016/0202829 performs touch detection on a display region based on capacitance changes in the detection electrodes. Display devices with a touch detection function include a button having an input function in a peripheral region around a display region. Widely known are techniques for integrating such an input button in the peripheral region of touch panels and display devices.

U.S. Unexamined Patent Application Publication No. 2016/0202829, however, does not describe touch detection on the peripheral region. It may possibly be difficult for the detection electrodes provided in the display region to perform touch detection on the peripheral region.

SUMMARY

A display device according to one aspect includes a substrate, a plurality of first electrodes disposed in a matrix in a display region of the substrate, a plurality of second electrodes disposed in a peripheral region on an outside of the display region of the substrate, a driver configured to supply a drive signal to the first electrodes and the second electrodes, and a plurality of wires coupled to the respective first electrodes. The first electrodes are electrically coupled to the driver via the respective wires, the first electrodes output detection signals corresponding to self-capacitance changes in the first electrodes, and the second electrodes output detection signals corresponding to self-capacitance changes in the second electrodes.

A display device according to one aspect includes a substrate, a plurality of first electrodes disposed in a matrix in a display region of the substrate, a second electrode provided along at least one side of a peripheral region on an outside of the display region, a driver configured to supply a drive signal to the second electrode, and a plurality of wires coupled to the respective first electrodes. The first electrodes are electrically coupled to the driver via the respective wires, and the first electrodes output a detection signal corresponding to capacitance changes between the first electrodes and the second electrode when the drive signal is supplied to the second electrode.

DETAILED DESCRIPTION

Figure 1:
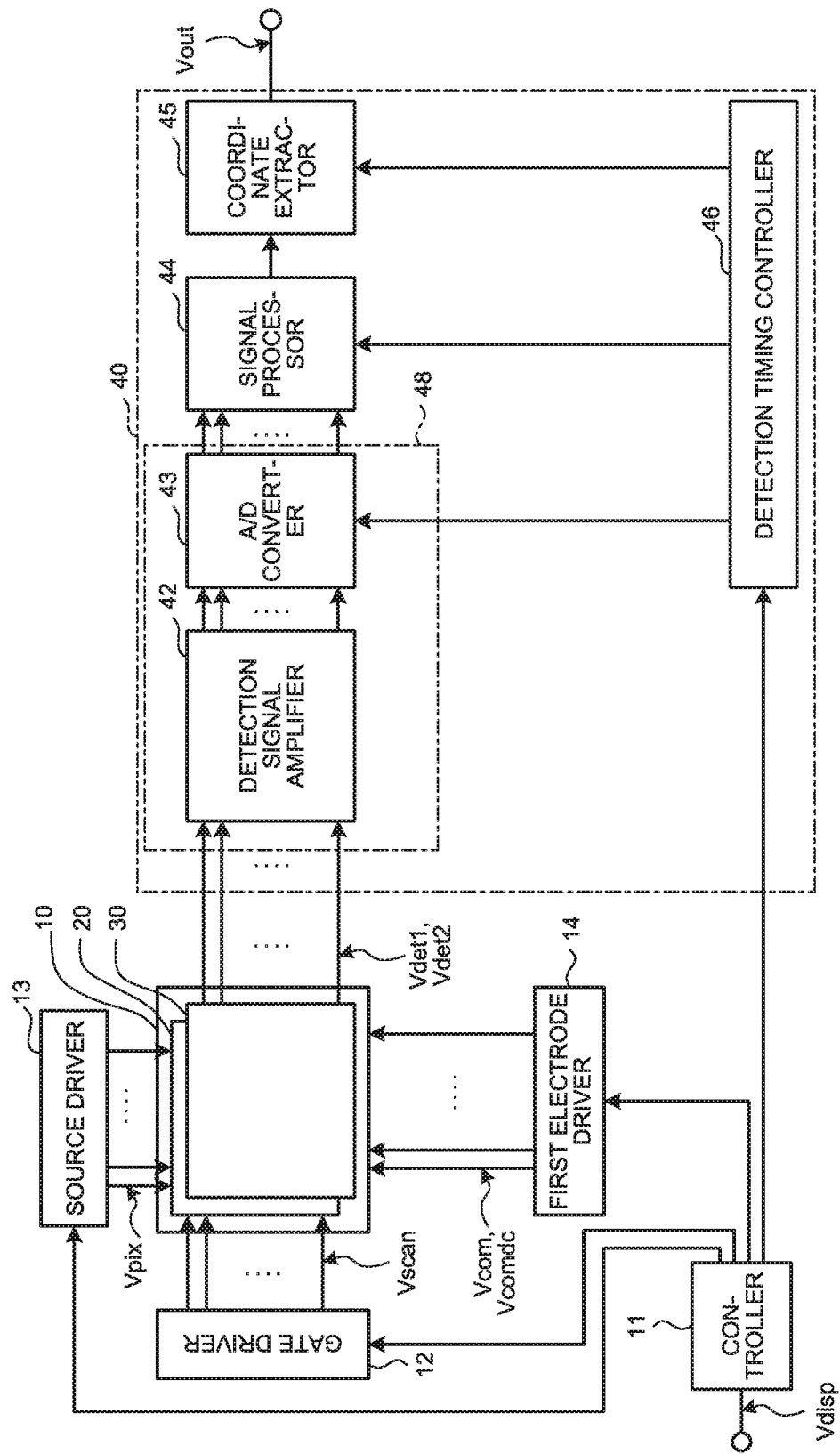
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the drawings, components similar to those previously described with reference to previous figures are denoted by like reference numerals, and overlapping explanation thereof may be appropriately omitted.

First Embodiment

FIG. 1 is a block diagram of an exemplary configuration of a display device according to a first embodiment of the present disclosure. As illustrated in FIG. 1, a display device 1 includes a display panel 10, a controller 11, a gate driver 12, a source driver 13, a first electrode driver 14, and a detector 40. The display panel 10 includes a display portion 20 and a touch sensor 30. The display portion 20 displays an image. The touch sensor 30 is a detection device that detects touch input.

The display panel 10 is a display device in which the display portion 20 and the touch sensor 30 are integrated. Specifically, part of members, such as electrodes and substrates, of the display portion 20 are also used as electrodes and substrates of the touch sensor 30 in the display panel 10.

The display portion 20 includes liquid crystal display elements serving as display elements. The display portion 20 includes a plurality of pixels provided with the display elements and has a display surface facing the pixels. The display portion 20 receives video signals Vdisp to display an image composed of the pixels on the display surface. The display panel 10 may be a device in which the touch sensor 30 is mounted on the display portion 20. The display portion 20 may be an organic electroluminescence (EL) display panel, for example.

The controller 11 supplies control signals to the gate driver 12, the source driver 13, the first electrode driver 14, and the detector 40 based on the video signals Vdisp supplied from the outside. The controller 11 is a circuit that controls a display operation and a detection operation performed by the display device 1.

The gate driver 12 supplies scanning signals Vscan to one horizontal line to be a target of display drive in the display panel 10 based on the control signals supplied from the controller 11. As a result, one horizontal line to be a target of display drive is sequentially or simultaneously selected.

The source driver 13 is a circuit that supplies pixel signals Vpix to respective sub-pixels SPix (refer to FIG. 10) of the display portion 20. Part of the functions of the source driver 13 may be mounted on the display panel 10. In this case, the controller 11 may generate the pixel signals Vpix and supply them to the source driver 13.

The first electrode driver 14 is a circuit that supplies display drive signals Vcomdc to first electrodes COML (refer to FIG. 11) of the display panel 10. In touch detection, the first electrode driver 14 supplies detection drive signals Vcom to the first electrodes COML and second electrodes 53, 54, and 55 (refer to FIG. 11).

The controller 11 according to the present embodiment causes the display portion 20 to perform a display operation of performing display and causes the touch sensor 30 to perform a detection operation of detecting an object to be detected in a time-division manner. The first electrode driver 14 supplies the drive signals Vcomdc and Vcom to the first electrodes COML and the second electrodes 53, 54, and 55 based on the control signals supplied from the controller 11.

The touch sensor 30 performs touch detection based on the basic principle of touch detection by a self-capacitance method (also referred to as a self-method). If the touch sensor 30 detects an object to be detected in a contact state, the touch sensor 30 outputs detection signals Vdet2 to the detector 40. The touch sensor 30 can also perform touch detection based on the basic principle of touch detection by a mutual capacitance method (also referred to as a mutual method). If the touch sensor 30 detects an object to be detected in a contact state by the mutual capacitance method, the touch sensor 30 outputs detection signals Vdet1 to the detector 40.

In the present specification, a "contact state" indicates a state where an object to be detected is in contact with the display surface or in proximity to the display surface close enough to consider it in contact therewith. A "non-contact state" indicates a state where an object to be detected is neither in contact with the display surface nor in proximity to the display surface close enough to consider it in contact therewith.

The detector 40 is a circuit that determines whether a touch is made by an object to be detected on the display surface of the display panel 10 based on the control signals supplied from the controller 11 and on the detection signals Vdet1 output from the display panel 10 in mutual capacitance touch detection. The detector 40 also determines whether a touch is made by an object to be detected on the display surface of the display panel 10 based on the control signals supplied from the controller 11 and on the detection signals Vdet2 output from the display panel 10 in self-capacitance touch detection. If a touch is detected, the detector 40 calculates the coordinates at which the touch input is made, for example.

The detector 40 includes an analog front end circuit 48, a signal processor 44, a coordinate extractor 45, and a detection timing controller 46. The analog front end circuit 48 (hereinafter, referred to as an AFE 48) includes a detection signal amplifier 42 and an analog/digital (A/D) converter 43. The AFE 48 is an analog signal processing circuit that converts the detection signals Vdet1 and Vdet2 into digital signals and outputs them to the signal processor 44. The detection timing controller 46 controls the A/D converter 43, the signal processor 44, and the coordinate extractor 45 such that they operate synchronously with one another based on the control signals supplied from the controller 11.

In touch detection, the detection signal amplifier 42 amplifies the detection signals Vdet1 supplied from the display panel 10. The A/D converter 43 samples analog signals output from the detection signal amplifier 42 at a timing synchronized with the drive signals Vcom, thereby converting the analog signals into digital signals.

The signal processor 44 is a logic circuit that determines whether a touch is made on the display panel 10 based on the output signals from the A/D converter 43. The signal processor 44 performs processing of extracting a signal (absolute value |ΔV|) of the difference between the detection signals caused by a finger. The signal processor 44 compares the absolute value |ΔV| with a predetermined threshold voltage. If the absolute value |ΔV| is lower than the threshold voltage, the signal processor 44 determines that the object to be detected is in the non-contact state. By contrast, if the absolute value |ΔV| is equal to or higher than the threshold voltage, the signal processor 44 determines that the object to be detected is in the contact state or a proximity state. The detector 40 thus can perform touch detection.

The coordinate extractor 45 is a logic circuit that calculates, when the signal processor 44 detects a touch, the touch panel coordinates of the touch. The coordinate extractor 45 outputs the touch panel coordinates as output signals Vout. The coordinate extractor 45 may output the output signals Vout to the controller 11. The controller 11 can perform a predetermined display operation or a predetermined detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external control substrate, an external processor, or the like. The coordinate extractor 45, for example, may be provided to an external processor different from the display device 1. In this case, the detector 40 may output the signals processed by the signal processor 44 as the output signals Vout. Alternatively, the AFE 48 may be provided to the display device 1, and the signal processor 44 and the coordinate extractor 45 may be provided to an external processor. In this case, the detector 40 may output the digital signals processed by the A/D converter 43 as the output signals Vout.

Figure 2:
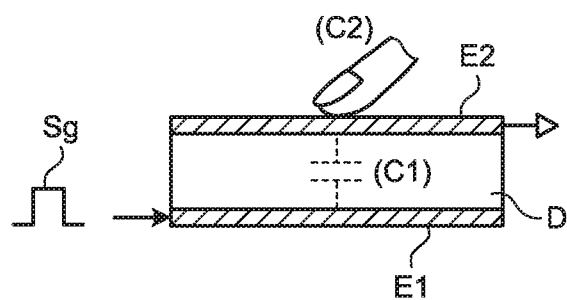
FIG. 2 is a diagram for explaining the basic principle of mutual capacitance touch detection.
Figure 3:
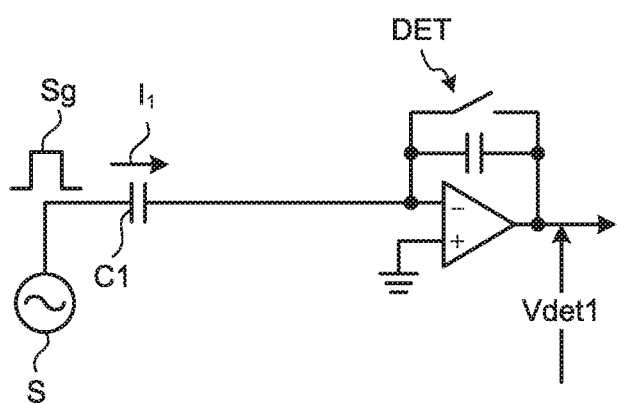
FIG. 3 is a diagram for explaining an example of an equivalent circuit in mutual capacitance touch detection.
Figure 4:
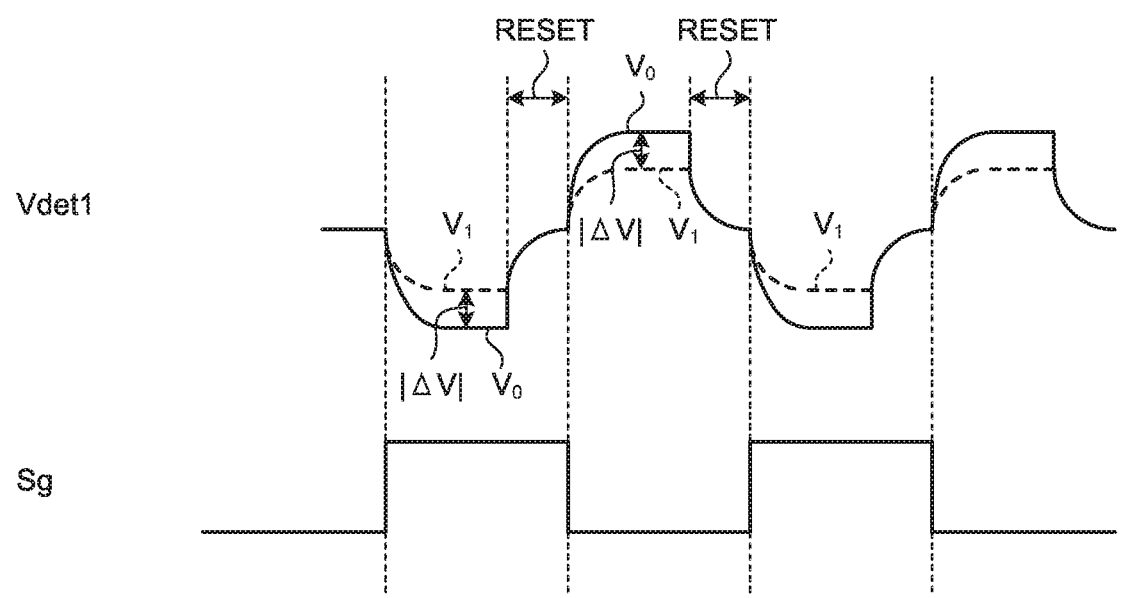
FIG. 4 is a diagram of an example of waveforms of a drive signal and a detection signal in mutual capacitance touch detection.

The following describes the basic principle of mutual capacitance touch detection performed by the display device 1 according to the present embodiment with reference to FIGS. 2 to 4. FIG. 2 is a diagram for explaining the basic principle of mutual capacitance touch detection. FIG. 3 is a diagram for explaining an example of an equivalent circuit in mutual capacitance touch detection. FIG. 4 is a diagram of an example of waveforms of a drive signal and a detection signal in mutual capacitance touch detection. While the following describes a case where a finger is in contact with or in proximity to a detection electrode, the object to be detected is not limited to a finger and may be a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from the ends of the drive electrode E1 to the upper surface of the detection electrode E2 besides lines of electric force (not illustrated) generated between the facing surfaces of the drive electrode E1 and the detection electrode E2. As illustrated in FIG. 3, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 1, for example.

When the AC signal source S applies an AC rectangular wave Sg at a predetermined frequency (e.g., a frequency of the order of several kilohertz to several hundred kilohertz) to the drive electrode E1 (first end of the capacitance element C1), an output waveform (detection signal Vdet1) illustrated in FIG. 4 appears via the voltage detector DET.

In the non-contact state, an electric current depending on the capacitance value of the capacitance element C1 flows. The voltage detector DET illustrated in FIG. 3 converts fluctuations in the electric current depending on the AC rectangular wave Sg into fluctuations in the voltage (waveform $V_0$ indicated by the solid line (refer to FIG. 4)).

In the contact state, as illustrated in FIGS. 2 and 3, capacitance C2 generated by the finger is in contact with the detection electrode E2 or in proximity to the detection electrode E2 close enough to consider it in contact therewith. The fringe lines of electric force between the drive electrode E1 and the detection electrode E2 are blocked by a conductor (finger). As a result, the capacitance element C1 acts as a capacitance element having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$ described above. Consequently, the absolute value |ΔV| of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detector 40 compares the absolute value |ΔV| with the predetermined threshold voltage, thereby determining whether an external proximity object is in the non-contact state or in the contact or proximity state. The detector 40 thus can perform touch detection based on the basic principle of mutual capacitance touch detection.

Figure 5:
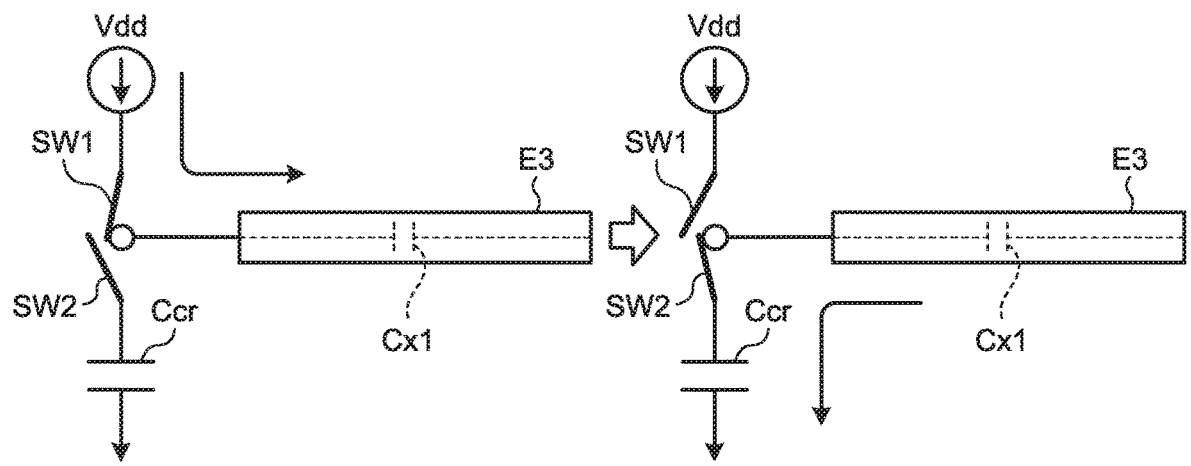
FIG. 5 is a diagram for explaining the basic principle of self-capacitance touch detection and illustrates a non-contact state.
Figure 6:
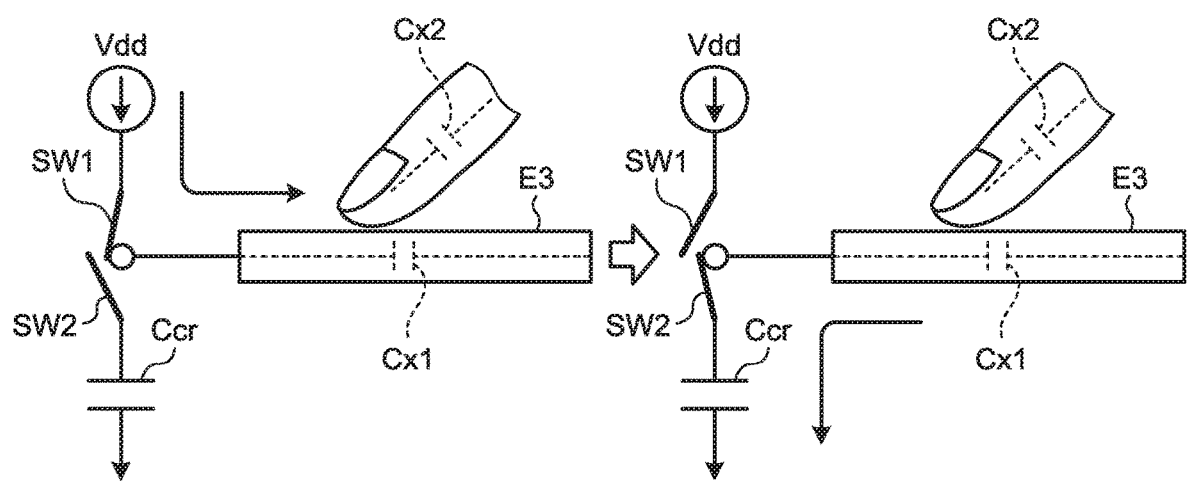
FIG. 6 is a diagram for explaining the basic principle of self-capacitance touch detection and illustrates a contact state.
Figure 7:
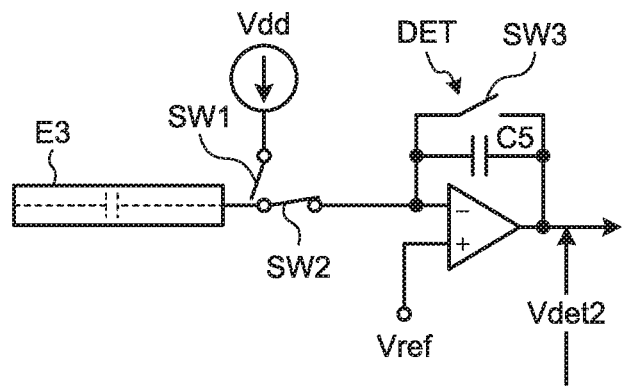
FIG. 7 is a diagram for explaining an example of an equivalent circuit in self-capacitance touch detection.
Figure 8:
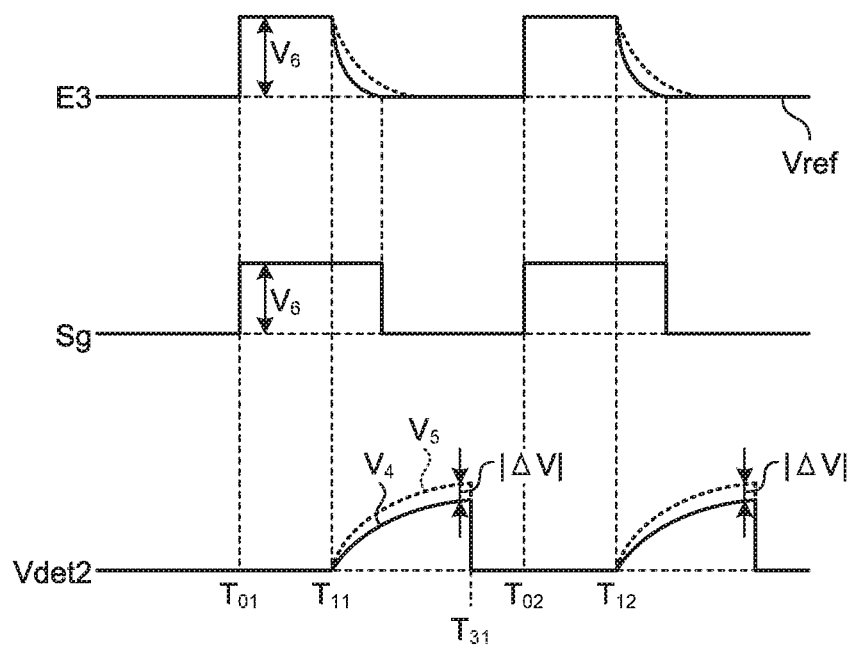
FIG. 8 is a diagram of an example of waveforms of a drive signal and a detection signal in self-capacitance touch detection.

The following describes the basic principle of self-capacitance touch detection with reference to FIGS. 5 to 8. FIG. 5 is a diagram for explaining the basic principle of self-capacitance touch detection and illustrates a non-contact state. FIG. 6 is a diagram for explaining the basic principle of self-capacitance touch detection and illustrates a contact state. FIG. 7 is a diagram for explaining an example of an equivalent circuit in self-capacitance touch detection. FIG. 8 is a diagram of an example of waveforms of a drive signal and a detection signal in self-capacitance touch detection.

The left figure in FIG. 5 illustrates a state where a detection electrode E3 is coupled to a power source Vdd by a switch SW1 but is not coupled to a capacitor Ccr by a switch SW2 in the non-contact state. In this state, capacitance Cx1 in the detection electrode E3 is charged. The right figure in FIG. 5 illustrates a state where the detection electrode E3 is not coupled to the power source Vdd by the switch SW1 but is coupled to the capacitor Ccr by the switch SW2. In this state, an electric charge of the capacitance Cx1 is discharged via the capacitor Ccr.

The left figure in FIG. 6 illustrates a state where the detection electrode E3 is coupled to the power source Vdd by the switch SW1 but is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 6 illustrates a state where the detection electrode E3 is not coupled to the power source Vdd by the switch SW1 but is coupled to the capacitor Ccr by the switch SW2. In this state, electric charges of the capacitance Cx1 and the capacitance Cx2 are discharged via the capacitor Ccr.

Because of the presence of the capacitance Cx2, the voltage change characteristics of the capacitor Ccr in discharging (contact state) illustrated in the right figure in FIG. 6 are clearly different from those of the capacitor Ccr in discharging (non-contact state) illustrated in the right figure in FIG. 5. Consequently, the self-capacitance method determines whether operating input is made by a finger or the like using the fact that the voltage change characteristics of the capacitor Ccr vary depending on the presence of the capacitance Cx2.

Specifically, an AC rectangular wave Sg (refer to FIG. 8) at a predetermined frequency (e.g., a frequency of the order of several kilohertz to several hundred kilohertz) is applied to the detection electrode E3. The voltage detector DET illustrated in FIG. 7 converts fluctuations in the electric current depending on the AC rectangular wave Sg into fluctuations in the voltage (waveforms $V_4$ and $V_5$).

In FIG. 8, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at voltage $V_6$ by the capacitance Cx1 (or Cx1+Cx2, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, the output from the voltage detector DET increases (refer to the detection signal Vdet2 in FIG. 8). In the non-contact state, the output (detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., several kilohertz to several hundred kilohertz). The detector 40 thus can perform touch detection based on the basic principle of self-capacitance touch detection.

Figure 9:
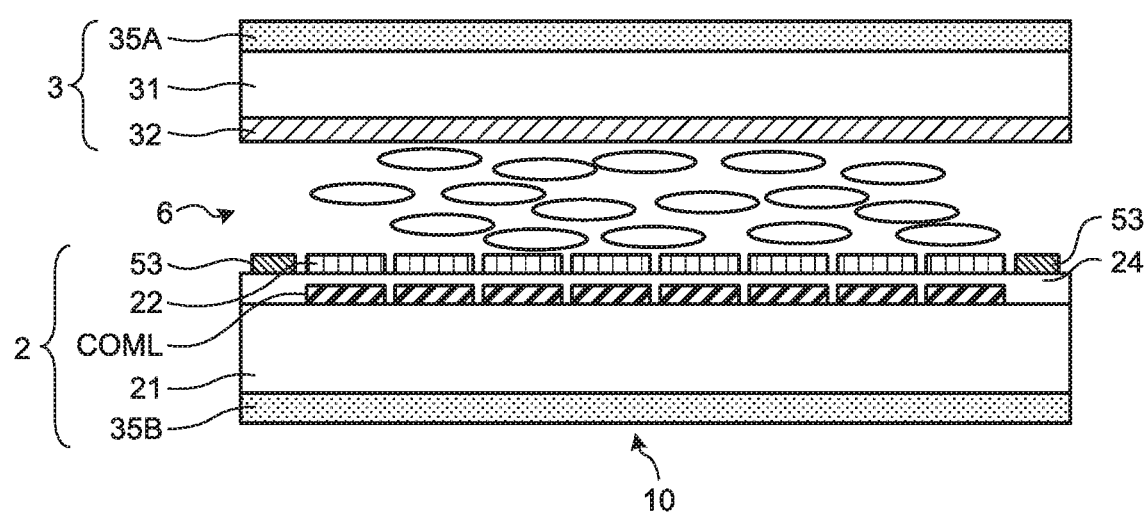
FIG. 9 is a sectional view of a schematic sectional structure of the display device according to the first embodiment.

The following describes an exemplary configuration of the display device 1 according to the present embodiment in greater detail. FIG. 9 is a sectional view of a schematic sectional structure of the display panel according to the first embodiment. As illustrated in FIG. 9, the display device 1 includes a pixel substrate 2, a counter substrate 3, and a liquid crystal layer 6 serving as a display functional layer. The counter substrate 3 is disposed facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, the first electrodes COML, the second electrodes 53, and a polarization plate 35B. The first substrate 21 is provided with circuits, such as gate scanners included in the gate driver 12, switching elements such as thin film transistors (TFT), and various kinds of wiring such as gate lines GCL and signal lines SGL (not illustrated in FIG. 9).

The first electrodes COML are provided on the first substrate 21. The pixel electrodes 22 are provided on the first electrodes COML with an insulating layer 24 interposed therebetween. The pixel electrodes 22 are provided to a layer different from that of the first electrodes COML and disposed overlapping the first electrodes COML in planar view. The second electrodes 53 are provided to the same layer as that of the pixel electrodes 22 and disposed on the side closer to the outer periphery of the first substrate 21 than the pixel electrodes 22. The pixel electrodes 22 are disposed in a matrix (row-column configuration) in planar view. The polarization plate 35B is provided below the first substrate 21. While the pixel electrodes 22 according to the present embodiment are provided above the first electrodes COML, the configuration is not limited thereto. The first electrodes COML may be provided on the pixel electrodes 22. In other words, the pixel electrodes 22 and the first electrodes COML are separated from each other in a direction perpendicular to the surface of the first substrate 21 with the insulating layer 24 interposed therebetween. One of the pixel electrodes 22 and the first electrodes COML is provided above the other thereof.

In the present specification, "above" indicates a direction from the first substrate 21 toward a second substrate 31 in the direction perpendicular to the surface of the first substrate 21, and "below" indicates a direction from the second substrate 31 toward the first substrate 21. The "planar view" indicates a view seen in the direction perpendicular to the surface of the first substrate 21.

The pixel electrodes 22 are provided corresponding to the respective sub-pixels SPix constituting each pixel Pix in the display panel 10. The pixel electrodes 22 are supplied with the pixel signals Vpix for performing a display operation from the source driver 13 (refer to FIG. 1). In the display operation, the first electrodes COML are supplied with the display drive signals Vcomdc serving as direct-current (DC) voltage signals. As a result, the first electrodes COML serve as common electrodes for a plurality of pixel electrodes 22. The first electrodes COML also serve as detection electrodes in touch detection.

The pixel electrodes 22, the first electrodes COML, and the second electrodes 53, 54, and 55 (FIG. 9 illustrates the second electrodes 53 alone) according to the present embodiment are made of a translucent conductive material, such as indium tin oxide (ITO).

The counter substrate 3 includes the second substrate 31, a color filter 32, and a polarizing plate 35A. The color filter 32 is provided to a first surface of the second substrate 31. The polarizing plate 35A is provided to a second surface of the second substrate 31. The color filter 32 faces the liquid crystal layer 6 in the direction perpendicular to the first substrate 21. The color filter 32 may be disposed on the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films (not illustrated in FIG. 9) are provided between the liquid crystal layer 6 and the pixel substrate 2 and between the liquid crystal layer 6 and the counter substrate 3 illustrated in FIG. 9.

An illuminator (backlight), which is not illustrated, is provided below the first substrate 21. The illuminator includes a light source, such as a light emitting diode (LED), and outputs light from the light source to the first substrate 21. The light from the illuminator passes through the pixel substrate 2 and is modulated depending on the state of the liquid crystals at the corresponding position. The state of light transmission to the display surface varies depending on the positions. With this mechanism, an image is displayed on the display surface.

Figure 10:
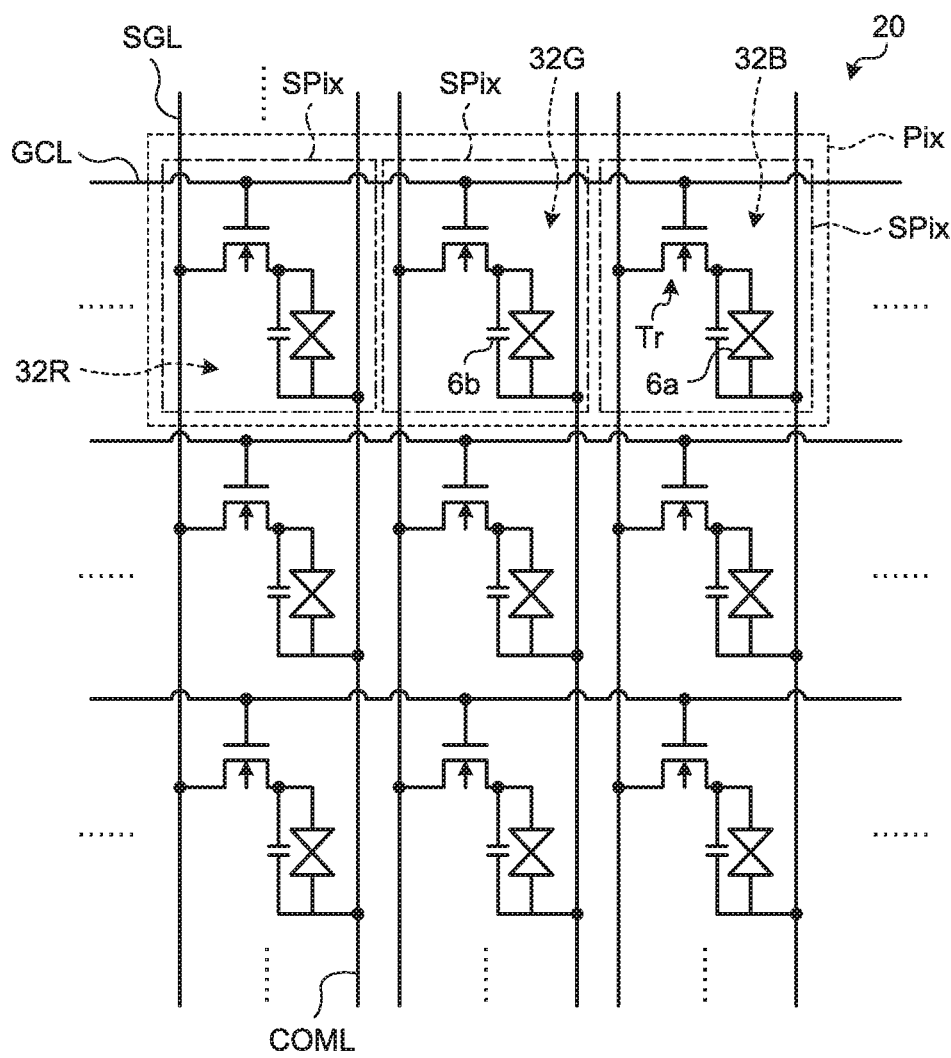
FIG. 10 is a circuit diagram of a pixel array in a display portion.

The following describes a display operation performed by the display panel 10. FIG. 10 is a circuit diagram of a pixel array in the display portion. The first substrate 21 (refer to FIG. 9) is provided with switching elements Tr of the respective sub-pixels SPix, the signal lines SGL, the gate lines GCL, and other components as illustrated in FIG. 10. The signal lines SGL and the gate lines GCL are electrically coupled to the switching elements Tr. The switching elements Tr are provided at respective intersections of the signal lines SGL and the gate lines GCL. The signal lines SGL are wiring that supplies the pixel signals Vpix to the pixel electrodes 22. The gate lines GCL are wiring that supplies drive signals for driving the switching elements Tr.

The signal lines SGL and the gate lines GCL extend on a plane parallel to the surface of the first substrate 21.

The display portion 20 illustrated in FIG. 10 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form holding capacitance 6b illustrated in FIG. 10.

The gate driver 12 illustrated in FIG. 1 sequentially selects the gate line GCL. The gate driver 12 applies scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the selected sub-pixels SPix via the signal lines SGL. The sub-pixels SPix perform display on each horizontal line based on the supplied pixel signals Vpix.

To perform the display operation, the first electrode driver 14 illustrated in FIG. 1 applies the display drive signals Vcomdc to the first electrodes COML. The display drive signal Vcomdc is a voltage signal serving as a common potential for a plurality of sub-pixels SPix. As a result, the first electrodes COML serve as common electrodes for the pixel electrodes 22 in the display operation. To perform display, the first electrode driver 14 applies the drive signals Vcomdc to all the first electrodes COML in a display region Ad (refer to FIG. 11).

The color filter 32 illustrated in FIG. 9 may include periodically arrayed color areas of the color filter 32 in three colors of red (R), green (G), and blue (B), for example. Color areas 32R, 32G, and 32B in the three colors of R, G, and B, respectively, serve as a set and correspond to the respective sub-pixels SPix illustrated in FIG. 10. A pixel Pix is composed of a set of sub-pixels SPix corresponding to the respective color areas 32R, 32G, and 32B in the three colors. The color filter 32 may include color areas in four or more colors.

Figure 11:
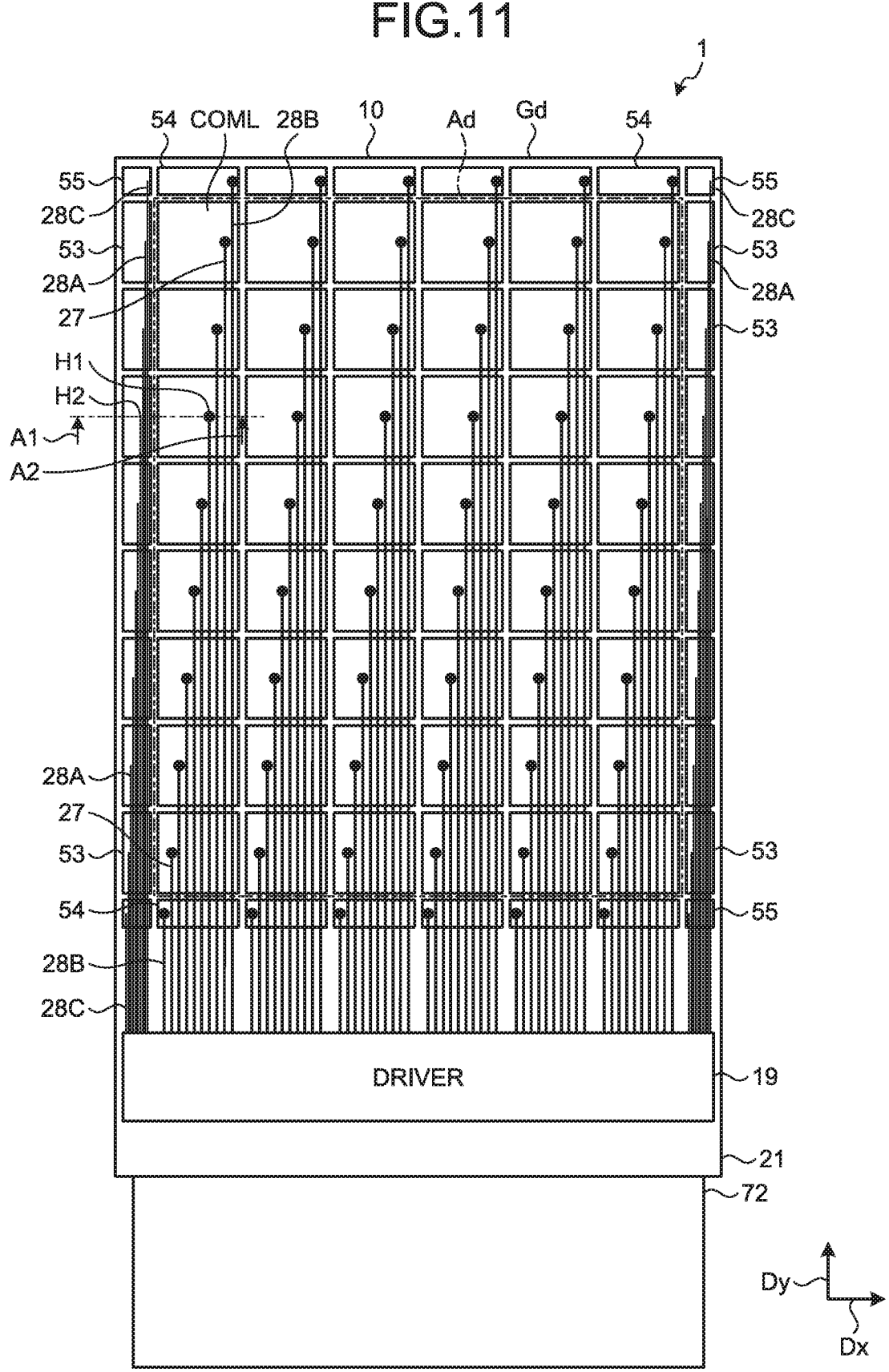
FIG. 11 is a plan view of a first substrate according to the first embodiment.

The following describes the configuration of the first electrodes COML and the second electrodes 53, 54, and 55 and a touch detection operation. FIG. 11 is a plan view of the first substrate according to the first embodiment. As illustrated in FIG. 11, the display device 1 has the display region Ad and a peripheral region Gd. In the present specification, the display region Ad is a region for displaying an image and overlapping with a plurality of pixels Pix (sub-pixels SPix). The peripheral region Gd is a region positioned on the inner side than the outer periphery of the first substrate 21 and on the outer side than the display region Ad. The peripheral region Gd may have a frame shape surrounding the display region Ad. In this case, the peripheral region Gd may also be referred to as a frame region.

The first electrodes COML according to the present embodiment are disposed in a matrix (row-column configuration) in the display region Ad of the first substrate 21. In other words, the first electrodes COML are arrayed in a first direction Dx and in a second direction Dy. The first electrodes COML are arrayed in the whole region of the display region Ad. The first electrodes COML are coupled to respective wires 27. In the example illustrated in FIG. 11, the wires 27 are coupled to the first electrodes COML in a one-to-one correspondence. The wires 27 extend in the second direction Dy and are arrayed in the first direction Dx with a space interposed therebetween. The first electrodes COML are coupled to a driver integrated circuit (IC) 19 via the respective wires 27.

The first direction Dx according to the present embodiment extends along one side of the display region Ad. The second direction Dy intersects the first direction Dx. The first direction Dx and the second direction Dy are not limited thereto, and the second direction Dy may intersect the first direction Dx at an angle other than 90 degrees. The plane defined by the first direction Dx and the second direction Dy is parallel to the surface of the first substrate 21. The direction orthogonal to the first direction Dx and the second direction Dy is the thickness direction of the first substrate 21 (refer to FIG. 9).

The second electrodes 53, 54, and 55 are disposed in the peripheral region Gd on the outside of the display region Ad. The second electrodes 53, 54, and 55 are provided not overlapping the first electrodes COML in planar view. A plurality of second electrodes 53 are provided in the peripheral region Gd along the second direction Dy and arrayed in the second direction Dy. The second electrode 53 has a rectangular shape with its long side extending in the second direction Dy. The array pitch of the second electrodes 53 according to the present embodiment in the second direction Dy is equal to that of the first electrodes COML in the second direction Dy. In other words, the second electrodes 53 are disposed side by side with the respective first electrodes COML in the first direction Dx. The length of the second electrode 53 in the second direction Dy is substantially equal to that of the first electrode COML in the second direction Dy. The space between the second electrodes 53 is substantially equal to that of the first electrodes COML in the second direction Dy. The length of the second electrode 53 in the first direction Dx is shorter than that of the first electrode COML in the first direction Dx.

A plurality of second electrodes 54 are provided in the peripheral region Gd along the first direction Dx and arrayed in the first direction Dx. The second electrode 54 has a rectangular shape with its long side extending in the first direction Dx. The array pitch of the second electrodes 54 according to the present embodiment is equal to that of the first electrodes COML in the first direction Dx. The second electrodes 54 are disposed side by side with the respective first electrodes COML in the second direction Dy. The length of the second electrode 54 in the first direction Dx is substantially equal to that of the first electrode COML in the first direction Dx. The space between the second electrodes 54 is substantially equal to that of the first electrodes COML in the first direction Dx. The length of the second electrode 54 in the second direction Dy is shorter than that of the first electrode COML in the second direction Dy. In other words, the array pitch of the second electrodes 53 and that of the second electrodes 54 in the respective directions along one side of the peripheral region Gd are equal to the array pitches of the first electrodes COML.

The second electrodes 55 are provided at corners of the peripheral region Gd. The second electrode 55 is disposed side by side with an end of the second electrode 53 in the second direction Dy and with an end of the second electrode 54 in the first direction Dx. As described above, the second electrodes 53, 54, and 55 are provided to the four sides of the peripheral region Gd surrounding the first electrodes COML and disposed like a frame as a whole. The configuration is not limited thereto, and the second electrodes 53 and 54 may be provided along at least one side of the peripheral region Gd.

As illustrated in FIG. 11, a flexible substrate 72 is provided in the peripheral region Gd of the first substrate 21. The driver IC 19 is provided in the peripheral region Gd between the first electrodes COML and the flexible substrate 72.

The second electrodes 53 are coupled to the driver IC 19 via respective wires 28A. The second electrodes 54 are coupled to the driver IC 19 via respective wires 28B. The second electrodes 55 are coupled to the driver IC 19 via respective wires 28C.

The wires 27 are provided to a layer different from that of the first electrodes COML with an insulating layer (not illustrated) interposed therebetween. The wires 27 are provided under the first electrodes COML in planar view. The wires 28A, 28B, and 28C are provided to a layer different from that of the second electrodes 53, 54, and 55 with an insulating layer (not illustrated) interposed therebetween. The wires 28A and 28C are provided under the second electrodes 53 and 55 and extend in the second direction Dy. The wires 28B coupled to the second electrodes 54 on the opposite side of the driver IC 19 across the display region Ad are provided under the first electrodes COML and extend in the second direction Dy.

The driver IC 19 serves as the controller 11 illustrated in FIG. 1. The first electrode driver 14 illustrated in FIG. 1 is included in the driver IC 19. Part of the functions of the detector 40 may be included in the driver IC 19 or provided as functions of an external micro-processing unit (MPU). The AFE 48, for example, is included in the driver IC 19. The configuration is not limited thereto, and the first electrode driver 14 may be provided to the first substrate 21 or an external control substrate. The configuration of the driver IC 19 is not limited thereto, and the driver IC 19 may be provided to an external control substrate outside the module, for example. A touch IC 18 (refer to FIG. 15) may be provided besides the driver IC 19. In this case, the AFE 48 and other components may be provided to the touch IC 18.

In an example of an operating method performed by the display device 1, the display device 1 performs a touch detection operation (touch detection period) and a display operation (display period) in a time-division manner. The display device 1 may perform the touch detection operation and the display operation in any division manner.

In the display operation, the first electrode driver 14 (refer to FIG. 1) included in the driver IC 19 supplies the display drive signals Vcomdc to all the first electrodes COML. In self-capacitance touch detection, the first electrode driver 14 supplies the drive signals Vcom to the first electrodes COML simultaneously or in a time-division manner. The first electrodes COML output sensor output signals corresponding to capacitance changes in the first electrodes COML to the AFE 48. Based on the sensor output signals from the first electrodes COML, the display device 1 performs touch detection on the display region Ad. In other words, the first electrodes COML serve not only as common electrodes in the display operation but also as detection electrodes in self-capacitance touch detection.

In the display operation, the first electrode driver 14 (refer to FIG. 1) included in the driver IC 19 supplies voltage signals having the same electric potential as that of the display drive signals Vcomdc to all the second electrodes 53, 54, and 55. As a result, the second electrodes 53, 54, and 55 serve as shielding electrodes in the display operation.

In self-capacitance touch detection, the first electrode driver 14 supplies the drive signals Vcom to the second electrodes 53, 54, and 55 simultaneously or in a time-division manner. The second electrodes 53, 54, and 55 output sensor output signals corresponding to capacitance changes in the second electrodes 53, 54, and 55 to the AFE 48. Based on the sensor output signals from the second electrodes 53, 54, and 55, the display device 1 performs touch detection on the peripheral region Gd. In other words, the second electrodes 53, 54, and 55 are used as detection electrodes in self-capacitance touch detection.

With the second electrodes 53, 54, and 55 having the configuration described above, the distance between an object to be detected in contact with or in proximity to the peripheral region Gd and the second electrodes 53, 54, and 55 is smaller than that between the object to be detected and the first electrodes COML. As a result, the capacitance changes in the second electrodes 53, 54, and 55 caused by the object to be detected in the peripheral region Gd increase, thereby increasing the detection sensitivity in the peripheral region Gd. Consequently, the display device 1 according to the present embodiment has high detection performance in the peripheral region Gd.

Figure 12:
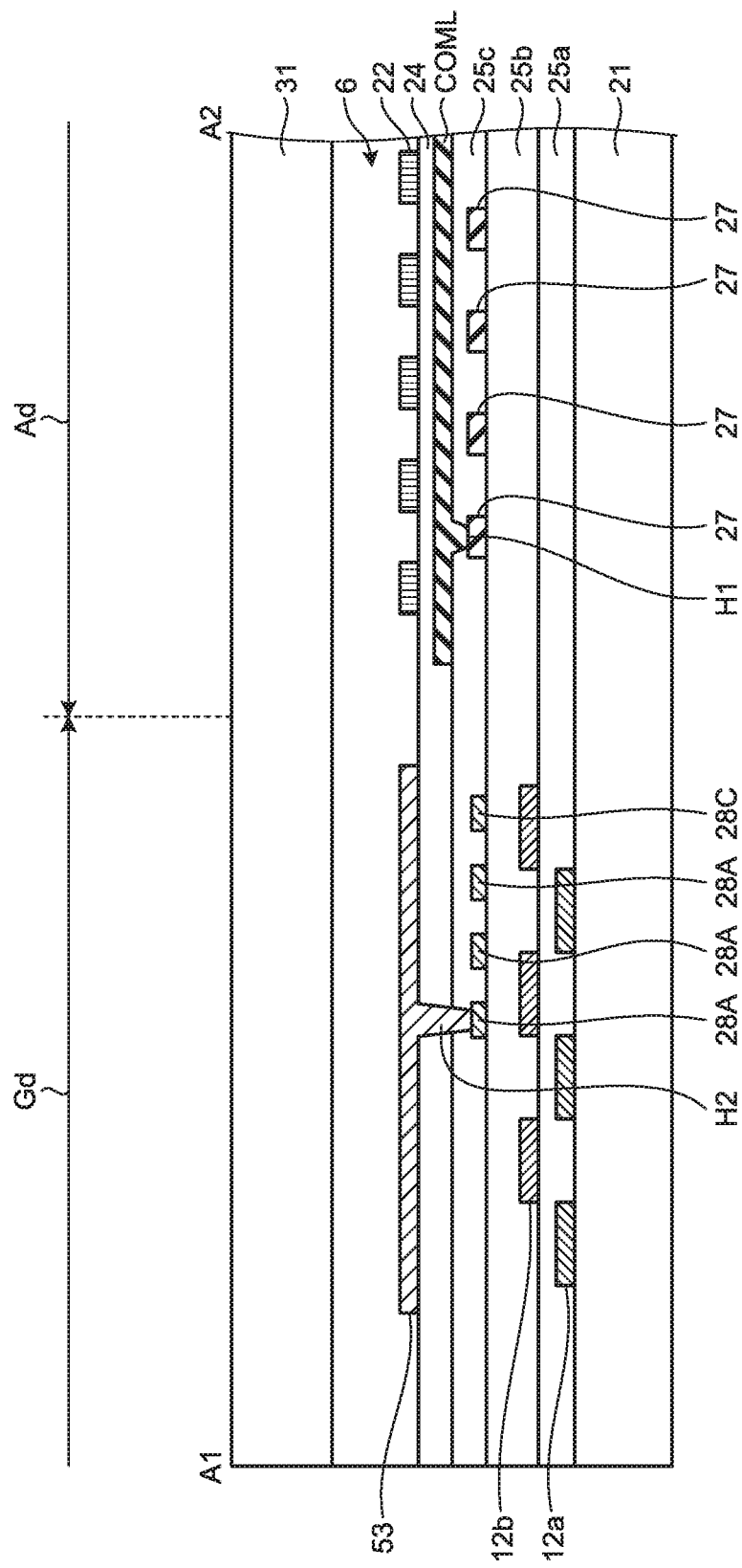
FIG. 12 is a sectional view along line A1-A2 in FIG. 11.

FIG. 12 is a sectional view along line A1-A2 in FIG. 11. As illustrated in FIG. 12, in the display region Ad, a plurality of wires 27 are provided on the first substrate 21 with an insulating layer 25a and a planarization layer 25b interposed therebetween. The first electrode COML is provided on the wires 27 with an insulating layer 25c interposed therebetween. The pixel electrodes 22 are provided on the first electrode COML with the insulating layer 24 interposed therebetween. One of the wires 27 provided under the first electrode COML is coupled to the first electrode COML through a contact hole H1.

In the peripheral region Gd, the second electrode 53 is provided on the insulating layer 24, that is, to a layer identical with that of the pixel electrodes 22 and different from that of the first electrode COML. The other second electrodes 53, which are not illustrated in FIG. 12, are provided to the same layer. In other words, the other second electrodes 53 are also provided to the same layer as that of the pixel electrodes 22. The wires 28A and 28C are provided to the same layer as that of the wires 27. One of the wires 28A is coupled to the second electrode 53 through a contact hole H2. Wires 12a and 12b are provided between the second electrode 53 and the first substrate 21 in the direction perpendicular to the surface of the first substrate 21. The wires 12a and 12b are included in a circuit, such as a gate scanner, included in the gate driver 12 (refer to FIG. 1).

The second electrodes 53 according to the present embodiment may be provided by using a guard ring provided to increase the reliability in the display operation as the drive electrodes for touch detection. In the display operation, the first electrode driver 14 supplies DC voltage signals having the same electric potential as that of the drive signals Vcomdc to the second electrodes 53. As a result, the second electrodes 53 shield noise in various kinds of circuits including the wires 12a and 12b, thereby increasing the display reliability.

Figure 13:
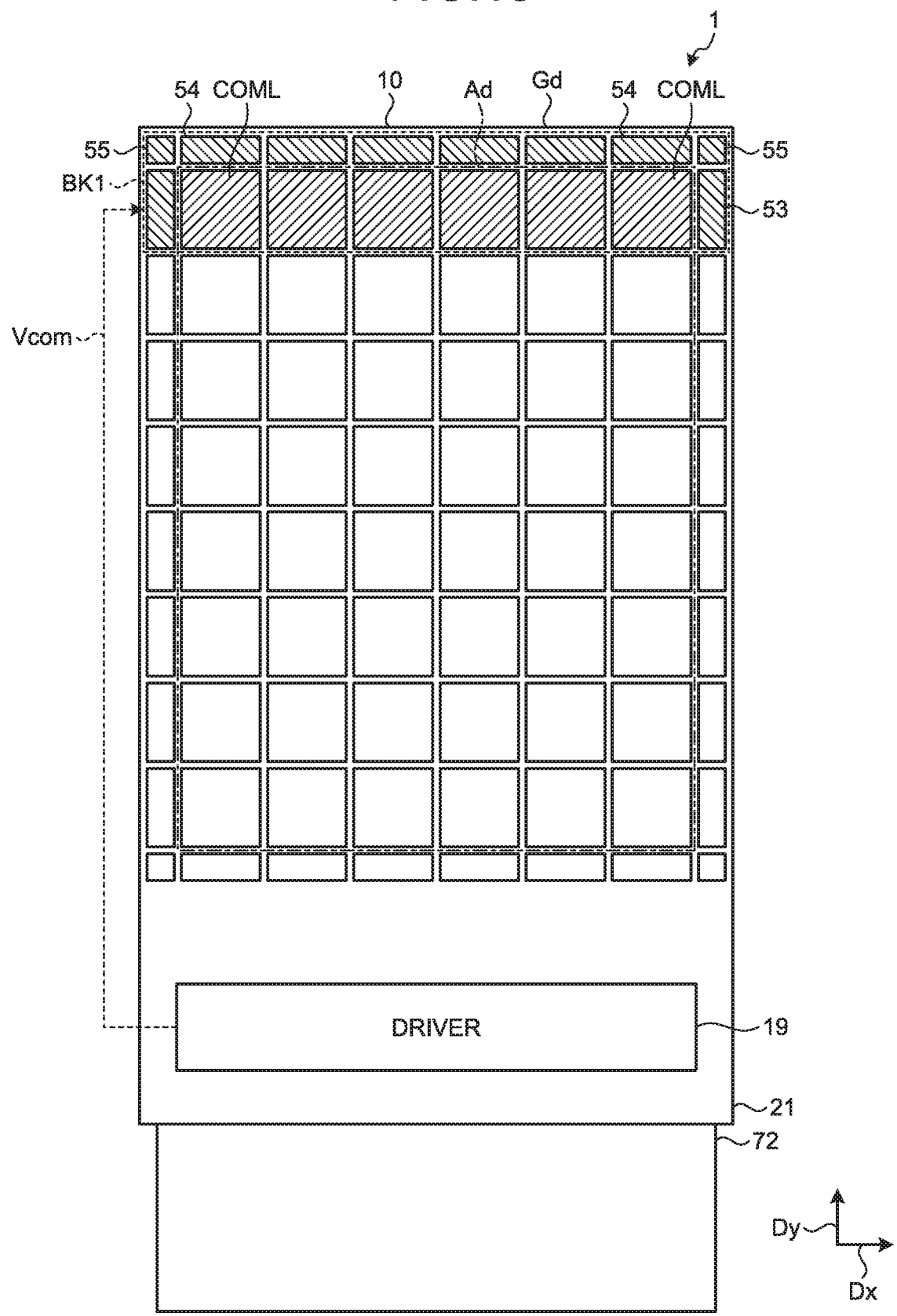
FIG. 13 is a diagram for explaining an exemplary operation in touch detection performed by the display device according to the first embodiment.
Figure 14:
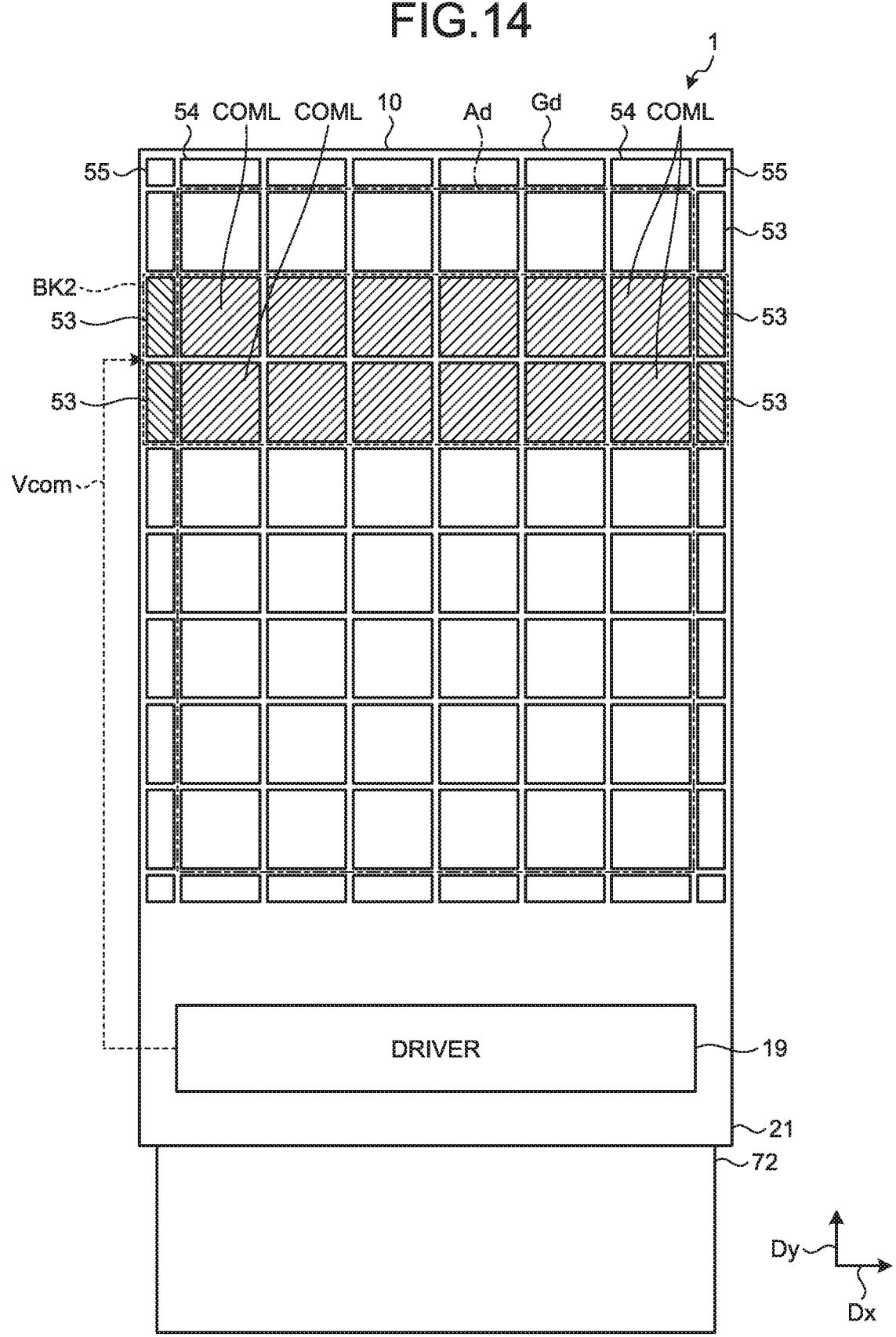
FIG. 14 is a diagram for explaining an exemplary operation in touch detection performed by the display device according to the first embodiment.

FIGS. 13 and 14 are diagrams for explaining an exemplary operation in touch detection performed by the display device according to the first embodiment. In touch detection, the display device 1 may drive the first electrodes COML and the second electrodes 53, 54, and 55 in any desired manner. In the example illustrated in FIGS. 13 and 14, the display device 1 performs detection on each detection electrode block BK in a time-division manner.

As illustrated in FIG. 13, the first electrode driver 14 (not illustrated in FIG. 13) included in the driver IC 19 selects a detection electrode block BK1. The detection electrode block BK1 includes the second electrodes 54 and the second electrodes 55 arrayed in the first direction Dx and the first electrodes COML and the second electrodes 53 arrayed in the first direction Dx. The first electrode driver 14 supplies the drive signals Vcom simultaneously to the first electrodes COML and the second electrodes 53, 54, and 55 included in the detection electrode block BK1. The first electrodes COML and the second electrodes 53, 54, and 55 included in the detection electrode block BK1 output the sensor output signals corresponding to respective self-capacitance changes to the AFE 48 (refer to FIG. 1). The display device 1 thus performs touch detection on the display region Ad and the peripheral region Gd overlapping with the detection electrode block BK1.

In the next period different from the period when the detection electrode block BK1 is selected, as illustrated in FIG. 14, the first electrode driver 14 (not illustrated in FIG. 14) selects a detection electrode block BK2. The detection electrode block BK2 includes the first electrodes COML and the second electrodes 53 arrayed in the first direction Dx and the first electrodes COML and the second electrodes 53 disposed side by side with them in the second direction Dy. The first electrode driver 14 supplies the drive signals Vcom simultaneously to the first electrodes COML and the second electrodes 53 included in the detection electrode block BK2. The first electrodes COML and the second electrodes 53 included in the detection electrode block BK2 output the sensor output signals corresponding to respective self-capacitance changes to the AFE 48. The display device 1 thus performs touch detection on the display region Ad and the peripheral region Gd overlapping with the detection electrode block BK2.

The first electrode driver 14 sequentially scans the detection electrode block BK including the first electrodes COML and the second electrodes 53, 54, and 55 of two lines. The display device 1 thus performs touch detection on one detection surface. The first electrode driver 14 supplies guard signals to the first electrodes COML and the second electrodes 53, 54, and 55 not included in the detection electrode block BK. The guard signal is a voltage signal synchronized with the drive signal Vcom and having the same electric potential as that of the drive signal Vcom. As a result, the non-selected first electrodes COML and the non-selected second electrodes 53, 54, and 55 not included in the detection electrode block BK are driven at the same electric potential as that of the detection electrode block BK. This mechanism can reduce stray capacitance in the detection electrode block BK.

As described above, the first electrodes COML and the second electrodes 53, 54, and 55 according to the present embodiment are divided into a plurality of detection electrode blocks BK each including a predetermined number of first electrodes COML and second electrodes 53, 54, and 55. The first electrode driver 14 supplies the drive signals Vcom to the detection electrode blocks BK in a time-division manner. The display device 1 simultaneously drives the first electrodes COML and the second electrodes 53, 54, and 55 in each of the detection electrode blocks BK, thereby performing touch detection on the display region Ad and the peripheral region Gd simultaneously.

As described above, the display device 1 performs detection on each of the detection electrode blocks BK. With this configuration, the display device 1 requires a smaller number of electrodes simultaneously coupled to the AFE 48 (refer to FIG. 1) than in a case where it drives all the first electrodes COML and the second electrodes 53, 54, and 55 simultaneously. As a result, the driver IC 19 provided with the AFE 48 requires a smaller number of terminals.

The exemplary operation illustrated in FIGS. 13 and 14 is given by way of example only, and the display device 1 may operate by another driving method. The first electrode driver 14, for example, may select the first electrodes COML and the second electrodes 53, 54, and 55 of one line as the detection electrode block BK. Alternatively, the first electrode driver 14 may select the first electrodes COML and the second electrodes 53, 54, and 55 of three or more lines as the detection electrode block BK. The number of simultaneously driven electrodes may be appropriately modified depending on the number of channels of the AFE 48.

Modifications of the First Embodiment

Figure 15:
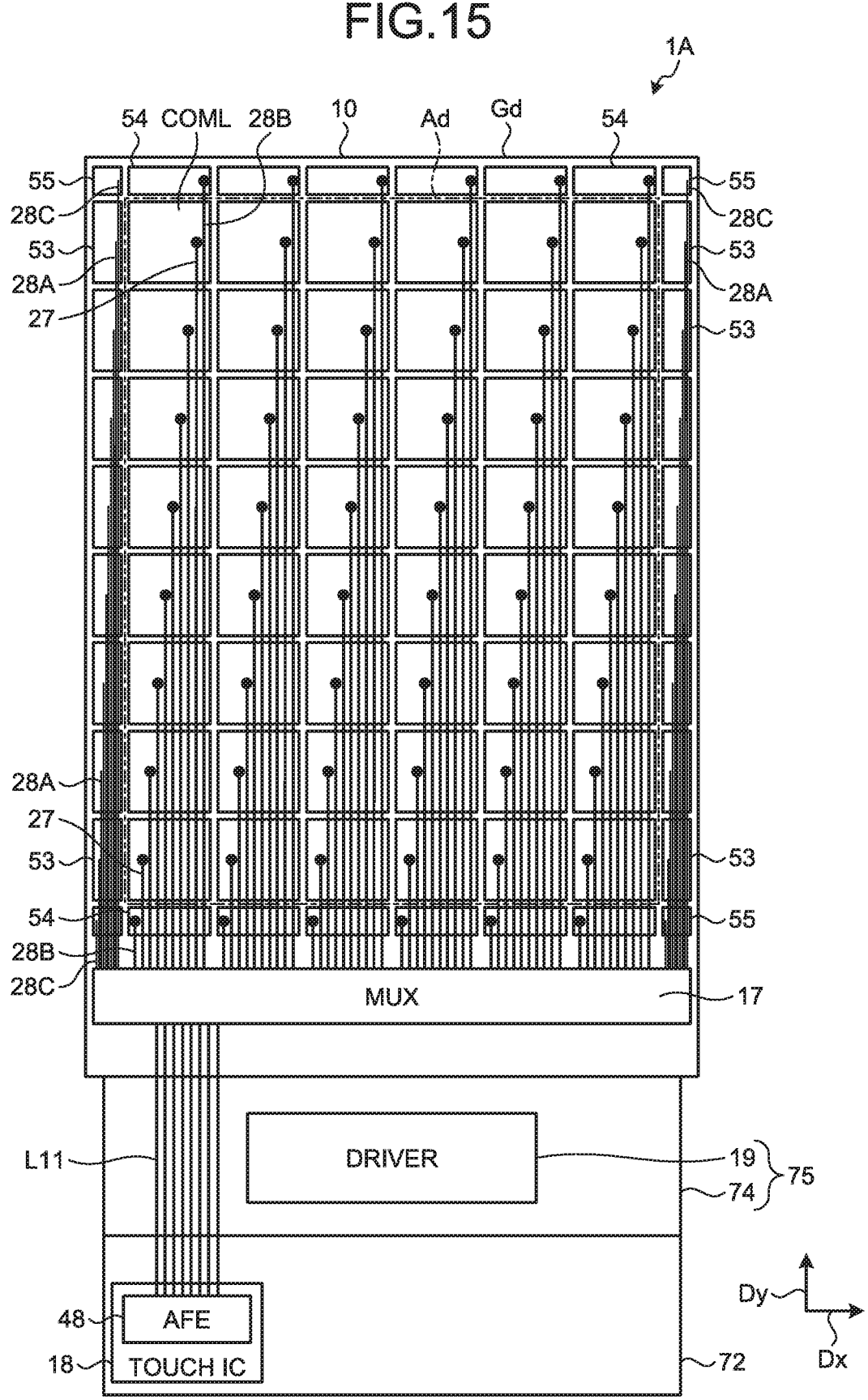
FIG. 15 is a schematic of a coupling configuration between first electrodes and an analog front end circuit in the display device according to a modification of the first embodiment.

In the configuration according to the first embodiment, one driver IC 19 is provided in the peripheral region Gd of the first substrate 21 as illustrated in FIG. 11, for example. The configuration is not limited thereto. FIG. 15 is a schematic of a coupling configuration between the first electrodes and the analog front end circuit in the display device according to a modification of the first embodiment.

As illustrated in FIG. 15, a display device 1A according to the present embodiment includes a chip on film (COF) 75 coupled to the first substrate 21. The flexible substrate 72 is coupled to the COF 75 on the opposite side of the first substrate 21. The COF 75 includes a film-like substrate 74 and the driver IC 19. The driver IC 19 is mounted on the substrate 74. The flexible substrate 72 is provided with the touch IC 18. The touch IC 18 includes the AFE 48.

The driver IC 19 mainly controls a display operation. The touch IC 18 mainly controls touch detection. In other words, the driver IC 19 supplies the display drive signals Vcomdc to the first electrodes COML. The touch IC 18 supplies the detection drive signals Vcom to the first electrodes COML and the second electrodes 53, 54, and 55.

A coupling circuit 17 is provided between the first electrodes COML and the COF 75 in the peripheral region Gd of the first substrate 21. The coupling circuit 17 is a coupling switching circuit that switches coupling and cutting off of the first electrodes COML to and from the AFE 48 and is a multiplexer, for example. The first electrodes COML are coupled to the coupling circuit 17 via the respective wires 27. The second electrodes 53, 54, and 55 are coupled to the coupling circuit 17 via the wires 28A, 28B, and 28C, respectively. The coupling circuit 17 is coupled to the AFE 48 via wires L11. The wires L11 are provided across the first substrate 21, the substrate 74, and the flexible substrate 72 and disposed not overlapping the driver IC 19. The coupling circuit 17 couples a plurality of wires 27 and a plurality of wires 28A, 28B, and 28C collectively to one wire L11. This configuration can make the number of wires L11 provided to the substrate 74 and the flexible substrate 72 smaller than the number of wires 27 and wires 28A, 28B, and 28C.

With the coupling circuit 17, the display device 1A requires a smaller number of terminals in the AFE 48 and the touch IC 18 than in a configuration where it couples all the wires 27 and the wires 28A, 28B, and 28C to the AFE 48 and the touch IC 18. Consequently, the touch IC 18 has a simpler configuration and a smaller chip size.

Figure 16:
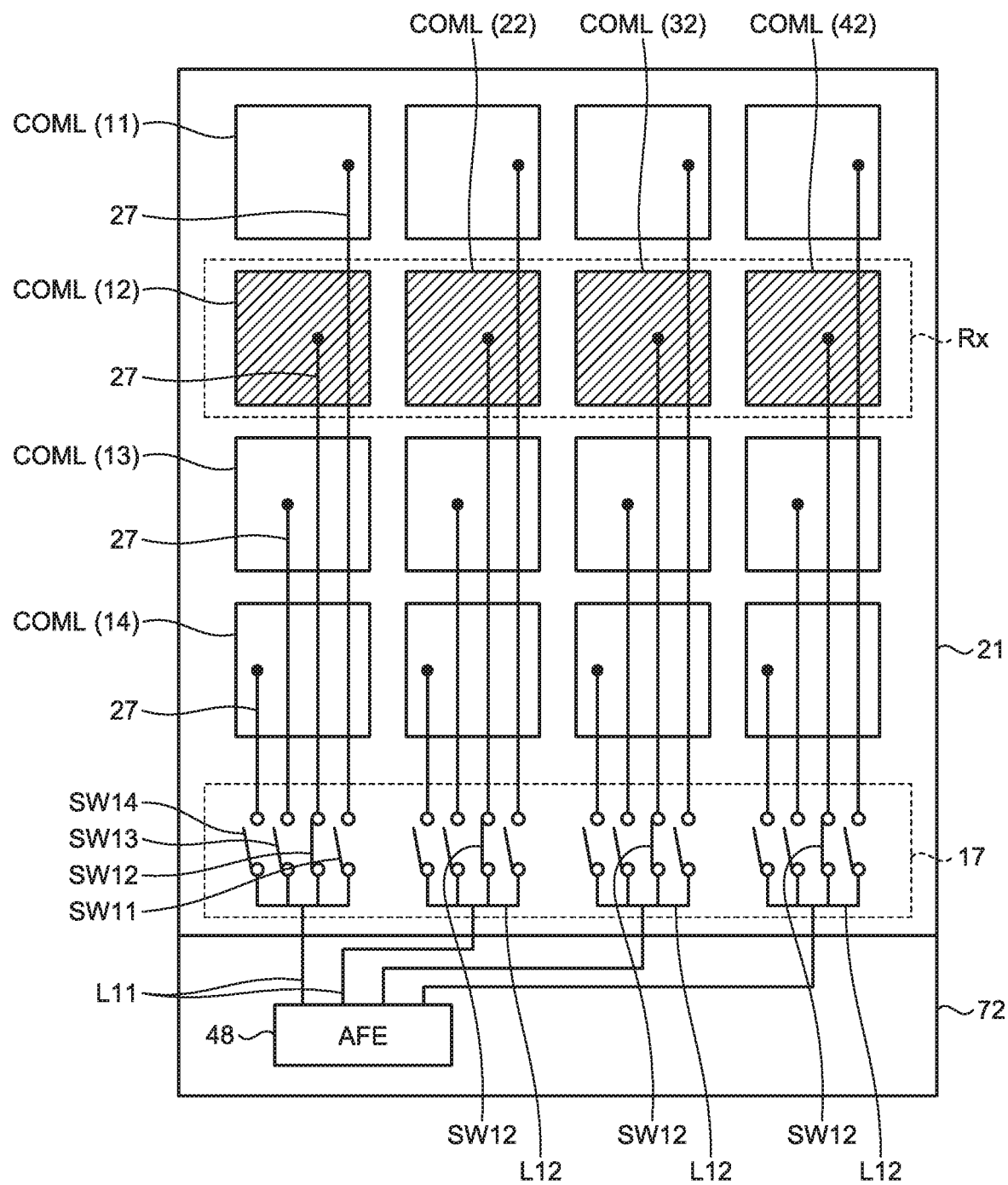
FIG. 16 is a circuit diagram of an example of a coupling circuit according to the modification of the first embodiment.

FIG. 16 is a circuit diagram of an example of the coupling circuit according to the modification of the first embodiment. FIG. 16 illustrates none of the second electrodes 53, 54, and 55, the wires 28A, 28B, and 28C, the COF 75, the driver IC 19, and the touch IC 18, for example. As illustrated in FIG. 16, for example, first electrodes COML(11), COML(12), COML(13), and COML(14) are arrayed in the second direction Dy. The first electrodes COML(11), COML(12), COML(13), and COML(14) are disposed closer to the AFE 48 in this order. First electrodes COML(12), COML(22), COML(32), and COML(42) are arrayed in the first direction Dx. In the following description, the first electrodes COML (11), COML(12), COML(13), COML(14), COML(22), COML(32), and COML(42) are referred to as the first electrodes COML when they need not be distinguished from one another.

The coupling circuit 17 includes switches SW11, SW12, SW13, and SW14 and wires L12. The switches SW11, SW12, SW13, and SW14 are provided corresponding to the first electrodes COML(11), COML(12), COML(13), and COML(14), respectively, arrayed in the second direction Dy. The switches SW11, SW12, SW13, and SW14 are coupled to one wire L11 via the common wire L12. The sets of the switches SW11, SW12, SW13, and SW14 and the wire L12 are provided for the respective sets of the first electrodes COML arrayed in the first direction Dx.

The operation of the switches SW11, SW12, SW13, and SW14 are controlled based on the control signals supplied from the driver IC 19 (refer to FIG. 15). In the example illustrated in FIG. 16, the switches SW12 are turned on, and the switches SW11, SW13, and SW14 are turned off. The first electrodes COML(12), COML(22), COML(32), and COML(42) arrayed in the first direction Dx are coupled to the AFE 48 via the respective wires L11. As a result, a detection electrode block Rx is selected. The switches SW11 to SW14 operate based on the control signals supplied from the driver IC 19, thereby sequentially selecting the detection electrode block Rx.

With the coupling circuit 17, the number of wires L11 coupled to the AFE 48 is equal to the number of first electrodes COML included in one detection electrode block Rx. In other words, this configuration can make the number of wires L11 smaller than the number of wires 27 coupled to the respective first electrodes COML.

Figure 17:
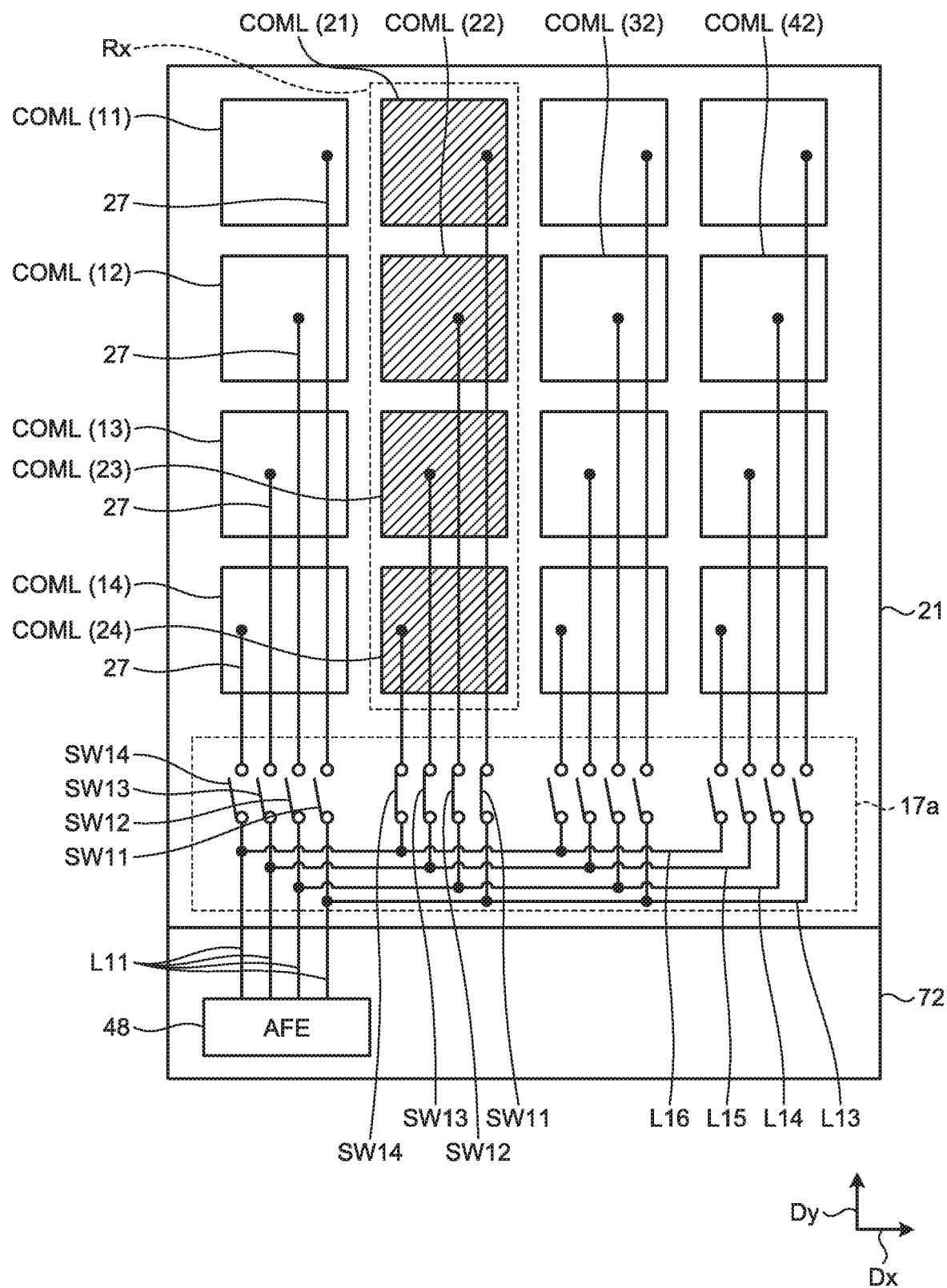
FIG. 17 is a circuit diagram of another example of the coupling circuit according to the modification of the first embodiment.

The configuration of the coupling circuit 17 illustrated in FIG. 16 is given by way of example only, and the configuration is not limited thereto. FIG. 17 is a circuit diagram of another example of the coupling circuit according to the modification of the first embodiment. A coupling circuit 17a illustrated in FIG. 17 includes the switches SW11, SW12, SW13, and SW14 and wires L13, L14, L15, and L16.

The switches SW11 are coupled to the AFE 48 via the common wire L13. The switches SW12 are coupled to the AFE 48 via the common wire L14. The switches SW13 are coupled to the AFE 48 via the common wire L15. The switches SW14 are coupled to the AFE 48 via the common wire L16.

In the example illustrated in FIG. 17, the switches SW11, SW12, SW13, and SW14 coupled to the first electrodes COML(21), COML(22), COML(23), and COML(24), respectively, arrayed in the second direction Dy are turned on. The first electrodes COML(21), COML(22), COML (23), and COML(24) arrayed in the second direction Dy are coupled to the AFE 48 via the wires L13, L14, L15, and L16, respectively. As a result, the detection electrode block Rx is selected. The switches SW11 to SW14 operate in each set of the first electrodes COML arrayed in the second direction Dy based on the control signals supplied from the driver IC 19, thereby sequentially selecting the detection electrode block Rx in the first direction Dx.

In the configuration of the coupling circuit 17a illustrated in FIG. 17, the array direction of the first electrodes COML included in the detection electrode block Rx is different from that in the configuration illustrated in FIG. 16. Also in the example illustrated in FIG. 17, the number of wires L11 coupled to the AFE 48 is equal to the number of first electrodes COML included in one detection electrode block Rx. In other words, this configuration can make the number of wires L11 smaller than the number of wires 27 coupled to the respective first electrodes COML. The coupling circuit 17 illustrated in FIG. 16 includes none of the wires L13, L14, L15, and L16 and thus is advantageously used to make the peripheral region Gd narrower compared with the coupling circuit 17a illustrated in FIG. 17.

Second Embodiment

Figure 18:
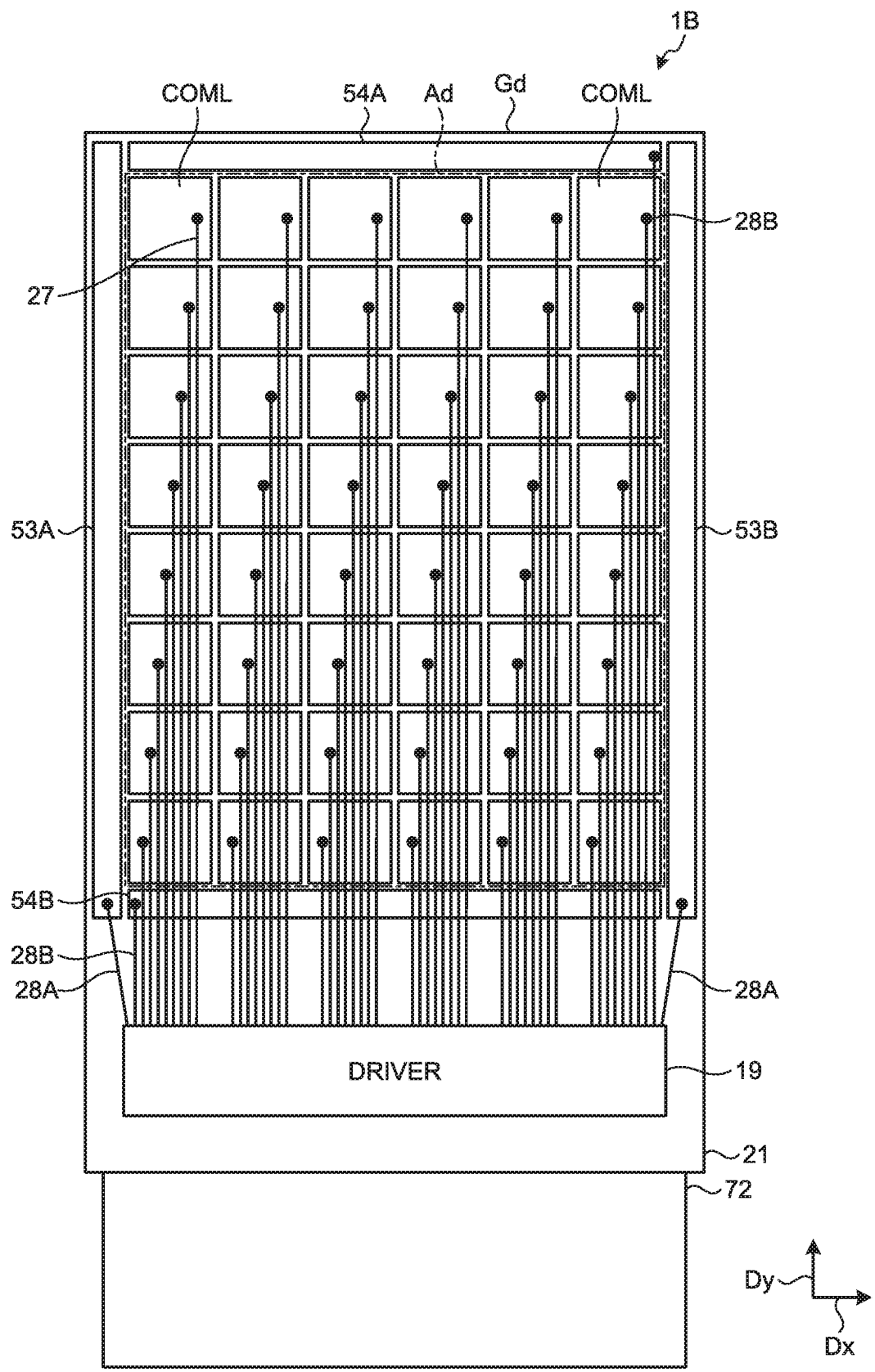
FIG. 18 is a plan view of the first substrate according to a second embodiment of the present disclosure.

FIG. 18 is a plan view of the first substrate according to a second embodiment of the present disclosure. A display device 1B according to the present embodiment includes two second electrodes 53A and 53B and two second electrodes 54A and 54B in the peripheral region Gd. The second electrodes 53A and 53B have a long shape with their long sides extending in the second direction Dy. The second electrodes 54A and 54B have a long shape with their long sides extending in the first direction Dx.

The second electrode 53A is provided to one of the long sides of the peripheral region Gd, and the second electrode 53B is provided to the other of the long sides of the peripheral region Gd. The first electrodes COML are disposed between the two second electrodes 53A and 53B. The second electrodes 53A and 53B are provided side by side with a plurality of first electrodes COML arrayed in the second direction Dy. The length of the second electrodes 53A and 53B in the second direction Dy is preferably substantially equal to or longer than that of the display region Ad in the second direction Dy. The length of the second electrodes 53A and 53B in the second direction Dy may be shorter than that of the display region Ad in the second direction Dy. The second electrodes 53A and 53B are coupled to the driver IC 19 via the respective wires 28A.

The second electrode 54A is provided to one of the short sides of the peripheral region Gd, and the second electrode 54B is provided to the other of the short sides of the peripheral region Gd. The second electrode 54A is provided in the peripheral region Gd at a position farther from the driver IC 19 than the display region Ad. The second electrode 54B is provided in the peripheral region Gd at a position closer to the driver IC 19 than the display region Ad.

The first electrodes COML are disposed between the two second electrodes 54A and 54B. The second electrodes 54A and 54B are provided side by side with a plurality of first electrodes COML arrayed in the first direction Dx. The length of the second electrodes 54A and 54B in the first direction Dx is preferably substantially equal to or longer than that of the display region Ad in the first direction Dx. The length of the second electrodes 54A and 54B in the first direction Dx may be shorter than that of the display region Ad in the first direction Dx. The second electrodes 54A and 54B are coupled to the driver IC 19 via the respective wires 28B.

With this configuration, the second electrodes 53A, 53B, 54A, and 54B form capacitance between themselves and the first electrodes COML disposed side by side therewith. The second electrodes 53A, 53B, 54A, and 54B are provided to the four sides of the peripheral region Gd surrounding the first electrodes COML. In other words, the second electrodes 53A, 53B, 54A, and 54B are provided like a frame as a whole. The configuration is not limited thereto, and at least one of the second electrodes 53A, 53B, 54A, and 54B may be provided along at least one side of the peripheral region Gd. The second electrodes 53A, 53B, 54A, and 54B each preferably continuously extend without being electrically separated in a portion along at least one side of the display region Ad.

In touch detection on the display region Ad, the display device 1B according to the second embodiment detects an object to be detected in the display region Ad based on capacitance changes in the first electrodes COML by self-capacitance touch detection described in the first embodiment. By contrast, the display device 1B detects an object to be detected in the peripheral region Gd by mutual capacitance touch detection. The following describes the touch detection in greater detail.

Figure 19:
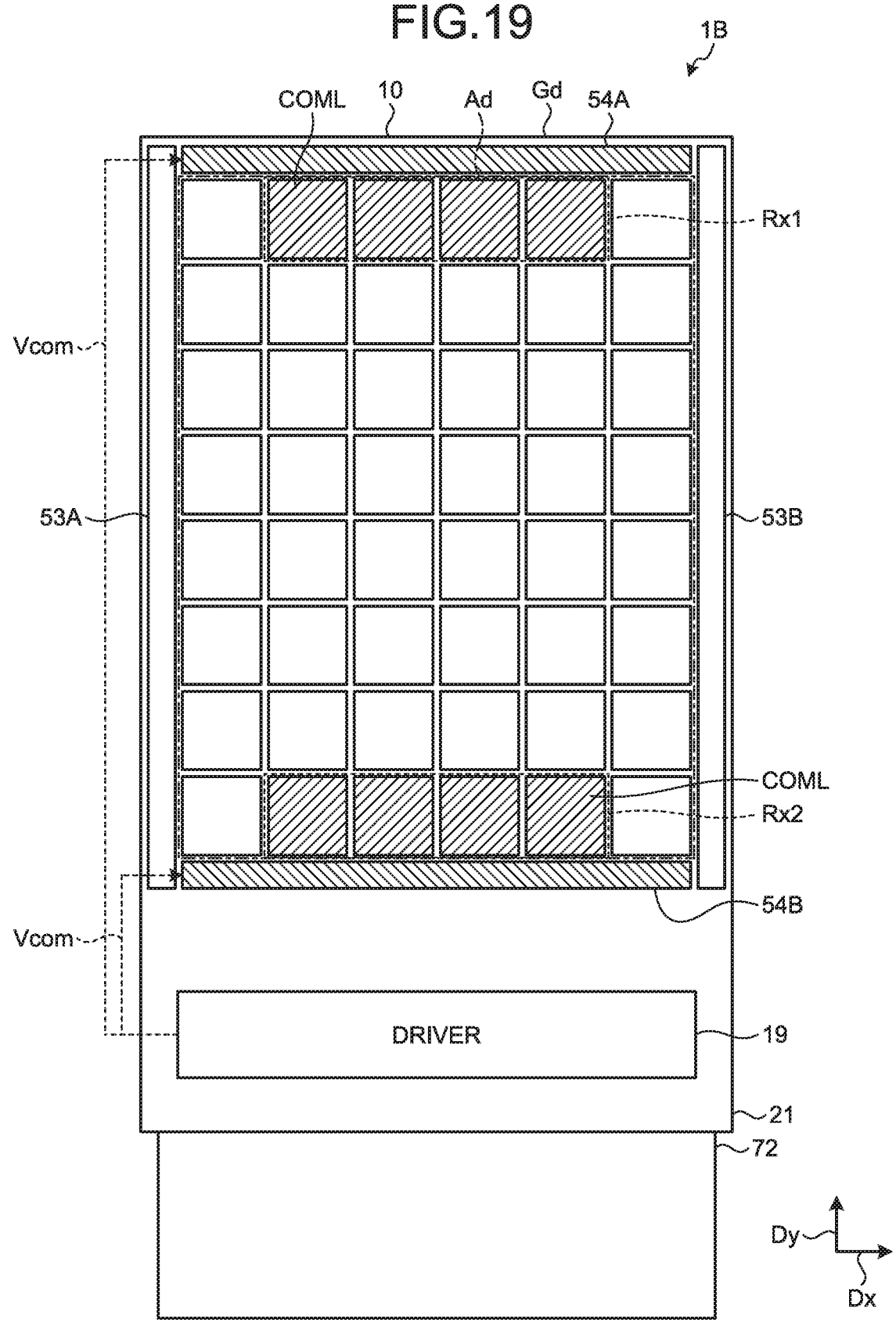
FIG. 19 is a diagram for explaining an exemplary operation in touch detection performed by the display device according to the second embodiment.
Figure 20:
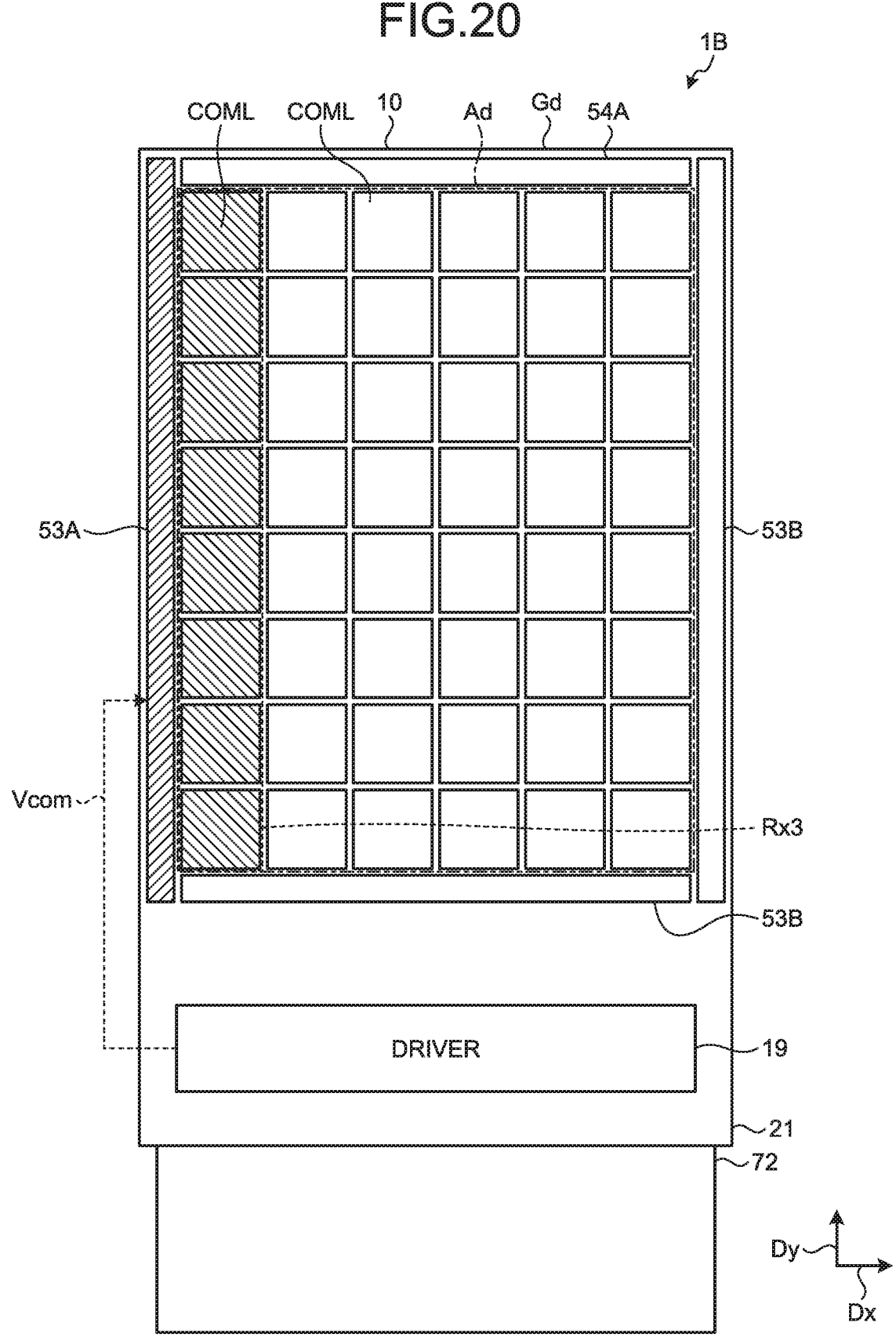
FIG. 20 is a diagram for explaining an exemplary operation in touch detection performed by the display device according to the second embodiment.
Figure 21:
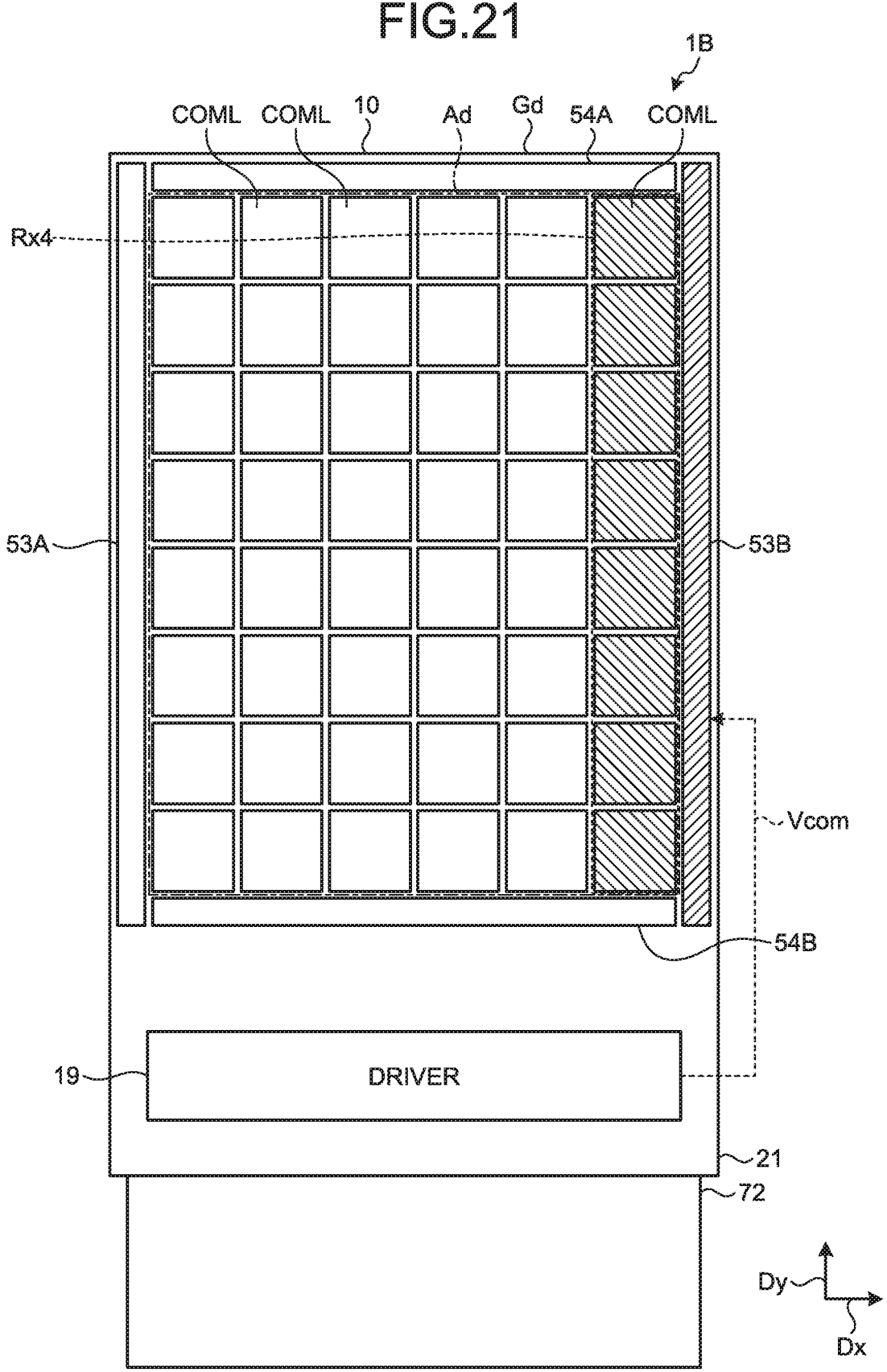
FIG. 21 is a diagram for explaining an exemplary operation in touch detection performed by the display device according to the second embodiment.

FIGS. 19, 20, and 21 are diagrams for explaining an exemplary operation in touch detection performed by the display device according to the second embodiment. The display device 1B according to the present embodiment performs touch detection on the peripheral region Gd based on changes in capacitance between the second electrodes 53A, 53B, 54A, and 54B and the first electrodes COML. Specifically, as illustrated in FIG. 19, the first electrode driver 14 supplies the drive signals Vcom to the second electrodes 54A and 54B.

The controller 11 (refer to FIG. 1) selects a plurality of first electrodes COML disposed side by side with the second electrode 54A out of the first electrodes COML as a detection target. The first electrodes COML disposed side by side with the second electrode 54A and arrayed in the first direction Dx are referred to as a detection electrode block Rx1. In other words, the first electrodes COML in the detection electrode block Rx1 are disposed side by side with the second electrode 54A and arrayed in the longitudinal direction of the second electrode 54A. The controller 11 (refer to FIG. 1) selects a plurality of first electrodes COML disposed side by side with the second electrode 54B out of the first electrodes COML as a detection target. The first electrodes COML disposed side by side with the second electrode 54B and arrayed in the first direction Dx are referred to as a detection electrode block Rx2. In other words, the first electrodes COML in the detection electrode block Rx2 are disposed side by side with the second electrode 54B and arrayed in the longitudinal direction of the second electrode 54B.

When the drive signal Vcom is supplied to the second electrode 54A, the first electrodes COML in the detection electrode block Rx1 output the sensor output signals corresponding to changes in capacitance between the second electrode 54A and the first electrodes COML to the AFE 48. Simultaneously, the first electrodes COML in the detection electrode block Rx2 output the sensor output signals corresponding to changes in capacitance between the second electrode 54B and the first electrodes COML to the AFE 48 (refer to FIG. 1). As described above, the first electrodes COML in the detection electrode blocks Rx1 and Rx2 serve as detection electrodes. Consequently, the display device 1B can detect the position of an object to be detected in a region along the short sides of the peripheral region Gd even in a case of the second electrodes 54A and 54B having a long shape. As described above, the display device 1B performs touch detection on the peripheral region Gd provided with the second electrodes 54A and the second electrode 54B by the mutual capacitance method.

In this case, the number of first electrodes COML included in the detection electrode blocks Rx1 and Rx2 is determined depending on the number of channels in the AFE 48. In the example illustrated in FIG. 19, eight first electrodes COML are simultaneously coupled to the AFE 48 in the same detection period. The number of first electrodes COML is not limited thereto, and seven or less or nine or more first electrodes COML may be coupled to the AFE 48.

As illustrated in FIG. 20, the first electrode driver 14 supplies the drive signal Vcom to the second electrode 53A. The controller 11 (refer to FIG. 1) selects a plurality of first electrodes COML disposed side by side with the second electrode 53A out of the first electrodes COML as a detection target. The first electrodes COML disposed side by side with the second electrode 53A and arrayed in the second direction Dy are referred to as a detection electrode block Rx3.

The detection electrode block Rx3 outputs the sensor output signals corresponding to changes in capacitance between the second electrode 53A and the first electrodes COML to the AFE 48. The display device 1B thus performs touch detection on one of the long sides of the peripheral region Gd provided with the second electrode 53A. In the example illustrated in FIG. 20, eight first electrodes COML arrayed in the second direction Dy are simultaneously coupled to the AFE 48 in the same detection period.

As illustrated in FIG. 21, the first electrode driver 14 supplies the drive signal Vcom to the second electrode 53B. The controller 11 (refer to FIG. 1) selects a plurality of first electrodes COML disposed side by side with the second electrode 53B out of the first electrodes COML as a detection target. The first electrodes COML disposed side by side with the second electrode 53B and arrayed in the second direction Dy are referred to as a detection electrode block Rx4.

The detection electrode block Rx4 outputs the sensor output signals corresponding to changes in capacitance between the second electrode 53B and the first electrodes COML to the AFE 48. The display device 1B thus performs touch detection on the other of the long sides of the peripheral region Gd provided with the second electrode 53B. Also in the example illustrated in FIG. 21, eight first electrodes COML arrayed in the second direction Dy are simultaneously coupled to the AFE 48 in the same detection period.

As described above, the first electrodes COML disposed side by side with the second electrodes 53A, 53B, 54A, and 54B serve as the detection electrode blocks Rx1, Rx2, Rx3, and Rx4 including a predetermined number of first electrodes COML. When a first number is the predetermined number, and a second number is the total number of first electrodes COML, the first number is smaller than the second number. The first electrode driver 14 supplies the drive signals Vcom to the second electrodes 53A, 53B, 54A, and 54B simultaneously or in a time-division manner. The first electrodes COML output the sensor output signals corresponding to the capacitance changes to the AFE 48 from each of the detection electrode blocks Rx1, Rx2, Rx3, and Rx4. The display device 1B thus performs touch detection on the peripheral region Gd by the mutual capacitance method. In other words, the second electrodes 53A, 53B, 54A, and 54B according to the present embodiment serve as drive electrodes, and the first electrodes COML in the detection electrode blocks Rx1, Rx2, Rx3, and Rx4 serve as detection electrodes. By performing the detection operation described above, the display device 1B can accurately detect the position of an object to be detected in the peripheral region Gd.

While the display device 1B performs touch detection on every eight first electrodes COML in a time-division manner in FIGS. 19 to 21, the present disclosure is not limited thereto. If the AFE 48 has enough channels, for example, the detection electrode blocks Rx1, Rx2, Rx3, and Rx4 may include eight or more first electrodes COML, or the second electrodes 53A, 53B, 54A, and 54B may be driven simultaneously. The detection electrode blocks Rx1, Rx2, Rx3, and Rx4 include the first electrodes COML positioned on the outermost side of the display region Ad, the configuration is not limited thereto. The detection electrode blocks Rx1, Rx2, Rx3, and Rx4 may include the first electrodes COML disposed on the inside of the display region Ad. In touch detection on the display region Ad, the display device 1B can detect an object to be detected based on capacitance changes in the first electrodes COML by the self-capacitance method described above.

Third Embodiment

Figure 22:
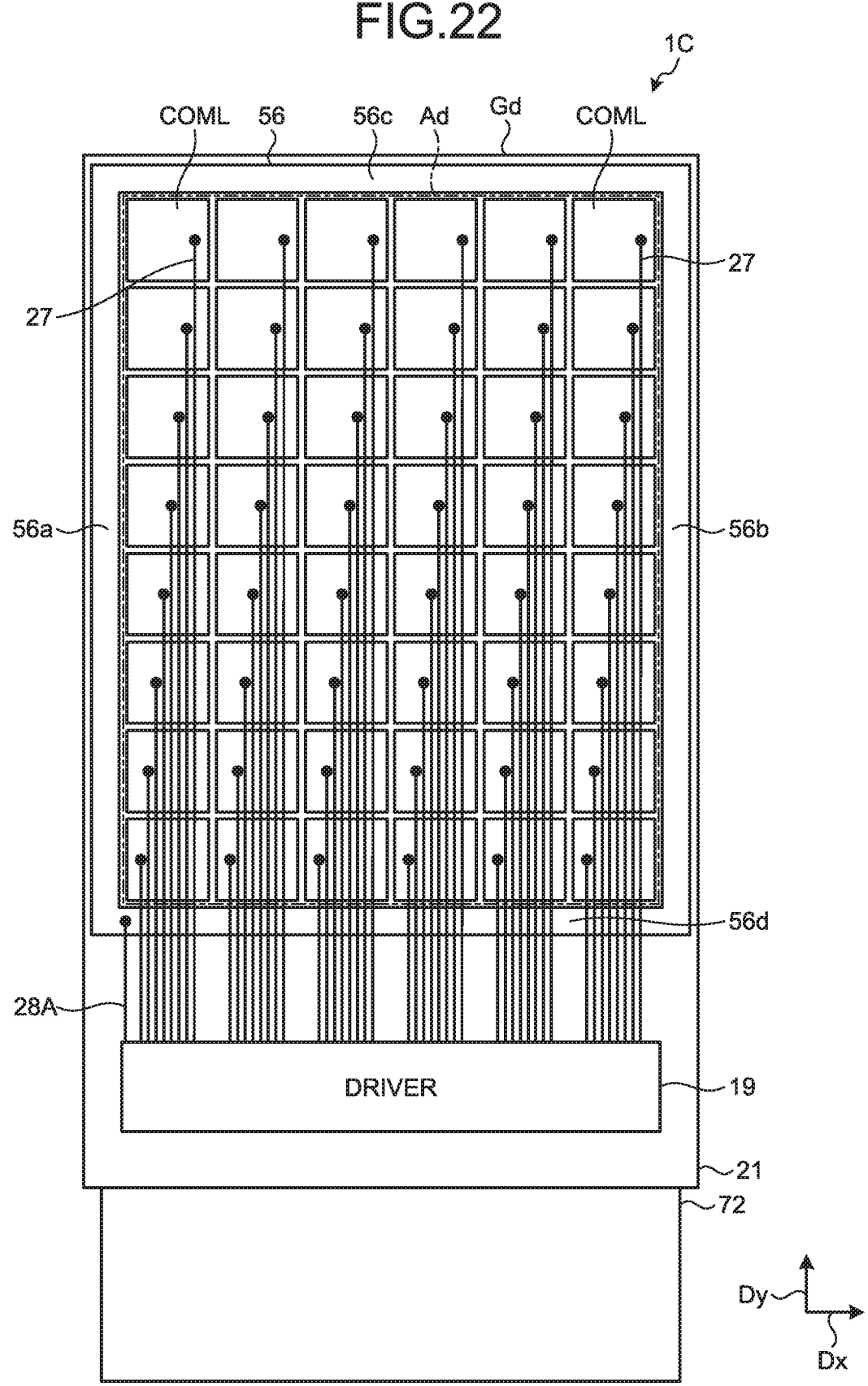
FIG. 22 is a plan view of the first substrate according to a third embodiment of the present disclosure.

FIG. 22 is a plan view of the first substrate according to a third embodiment of the present disclosure. A display device 1C according to the present embodiment includes a frame-like second electrode 56 in the peripheral region Gd. The second electrode 56 has a first region 56a, a second region 56b, a third region 56c, and a fourth region 56d.

The first region 56a and the second region 56b have a long shape with their long sides extending in the second direction Dy. The third region 56c and the fourth region 56d have a long shape with their long sides extending in the first direction Dx. The third region 56c couples one end of the first region 56a and one end of the second region 56b. The fourth region 56d couples the other end of the first region 56a and the other end of the second region 56b. As described above, the second electrode 56 is provided continuously along the four sides of the peripheral region Gd, thereby having a continuous frame shape. The second electrode 56 surrounds the display region Ad. The second electrode 56 is coupled to the driver IC 19 via the wire 28A.

Similarly to the example illustrated in FIG. 12, in the peripheral region Gd, the second electrode 56 according to the present embodiment is provided on the insulating layer 24, that is, to a layer identical with that of the pixel electrodes 22 and different from that of the first electrodes COML. The first region 56a, the second region 56b, the third region 56c, and the fourth region 56d are provided to a single layer identical with that of the pixel electrodes 22.

The second electrode 56 according to the present embodiment may be provided by using a guard ring provided to increase the reliability in the display operation as the drive electrodes for touch detection. In the display operation, the first electrode driver 14 supplies DC voltage signals having the same electric potential as that of the drive signals Vcomdc to the second electrode 56. As a result, the second electrode 56 shields noise in various kinds of circuits including the wires 12a and 12b, thereby increasing the display reliability.

Figure 23:
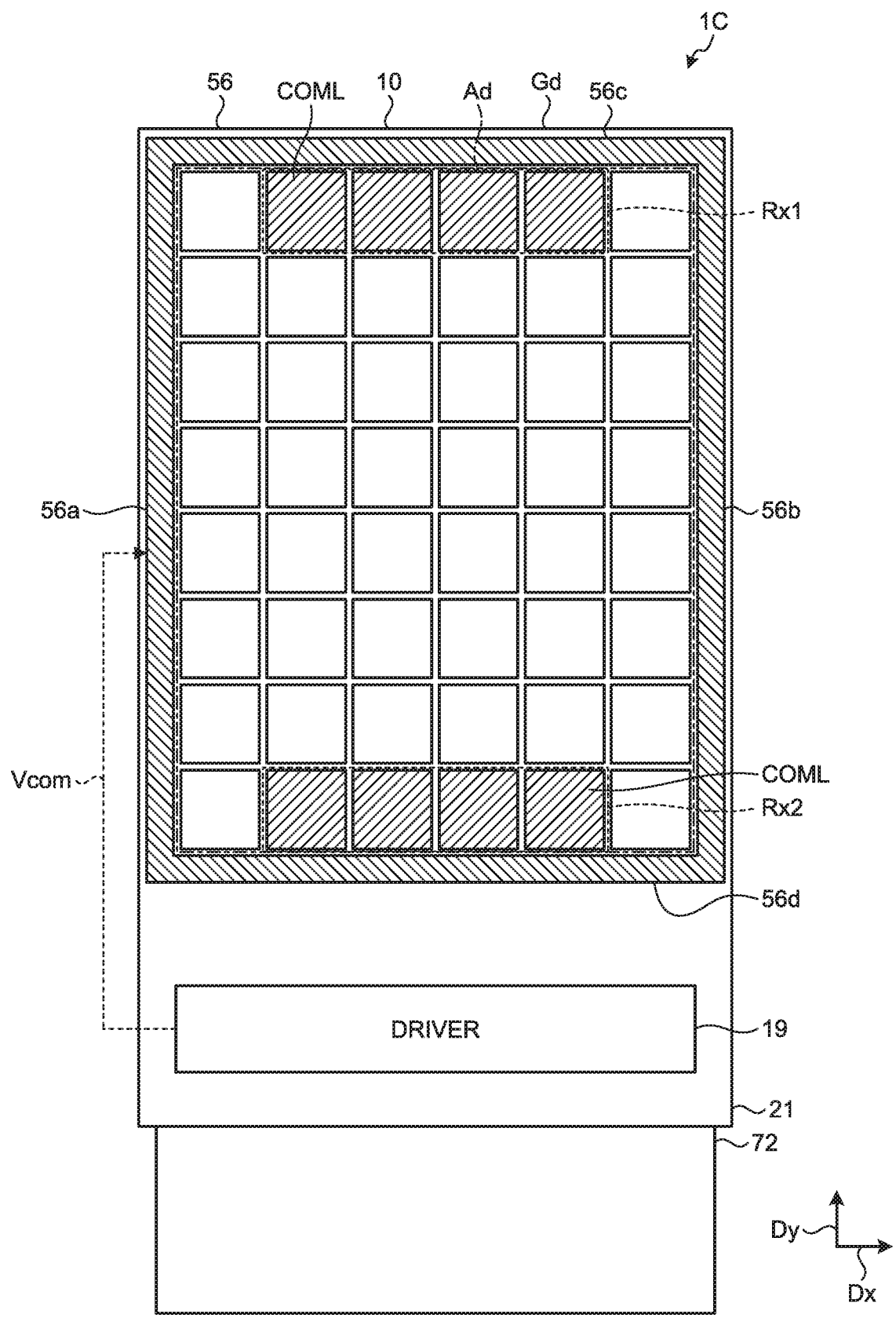
FIG. 23 is a diagram for explaining an exemplary operation in touch detection performed by the display device according to the third embodiment.
Figure 24:
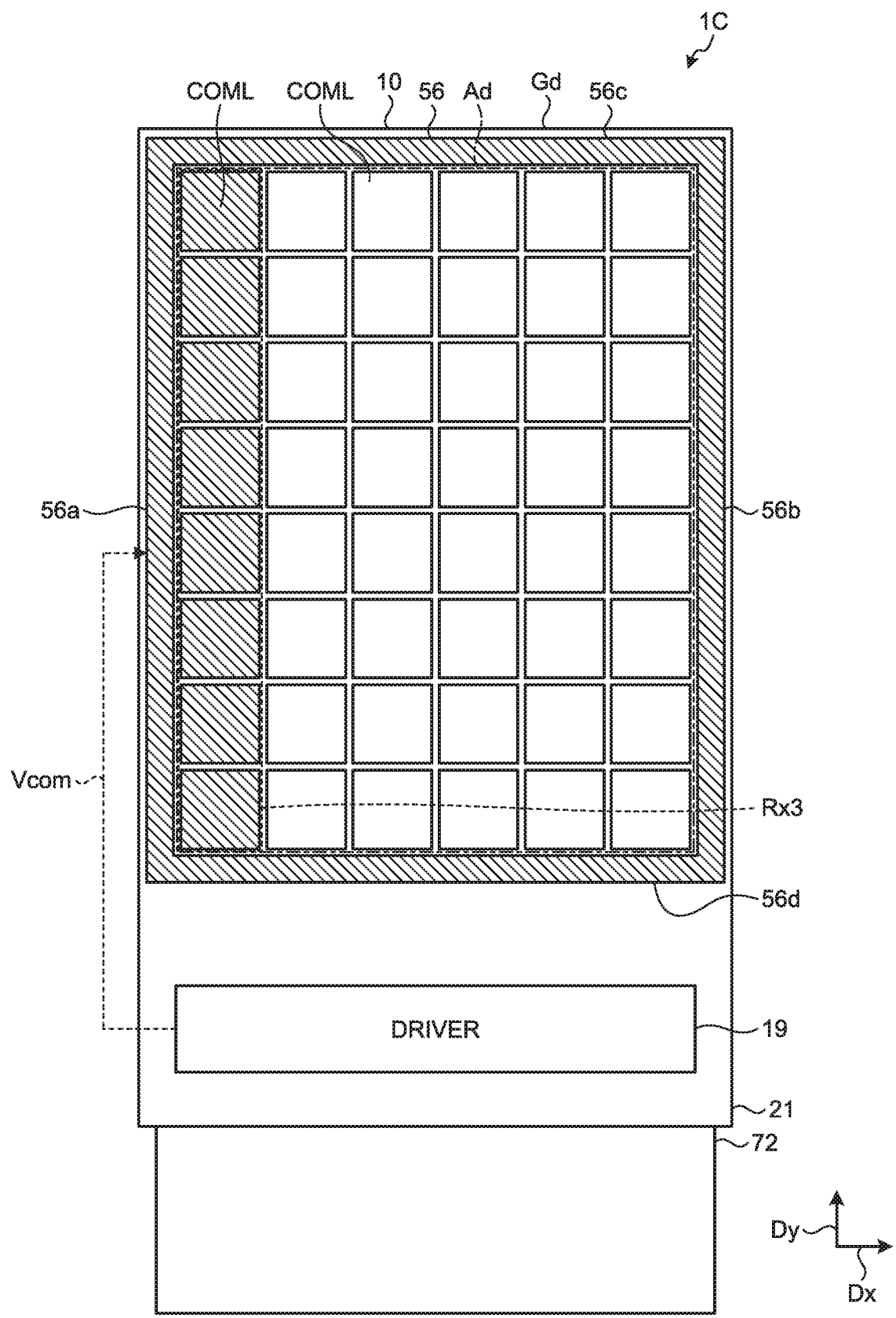
FIG. 24 is a diagram for explaining an exemplary operation in touch detection performed by the display device according to the third embodiment.
Figure 25:
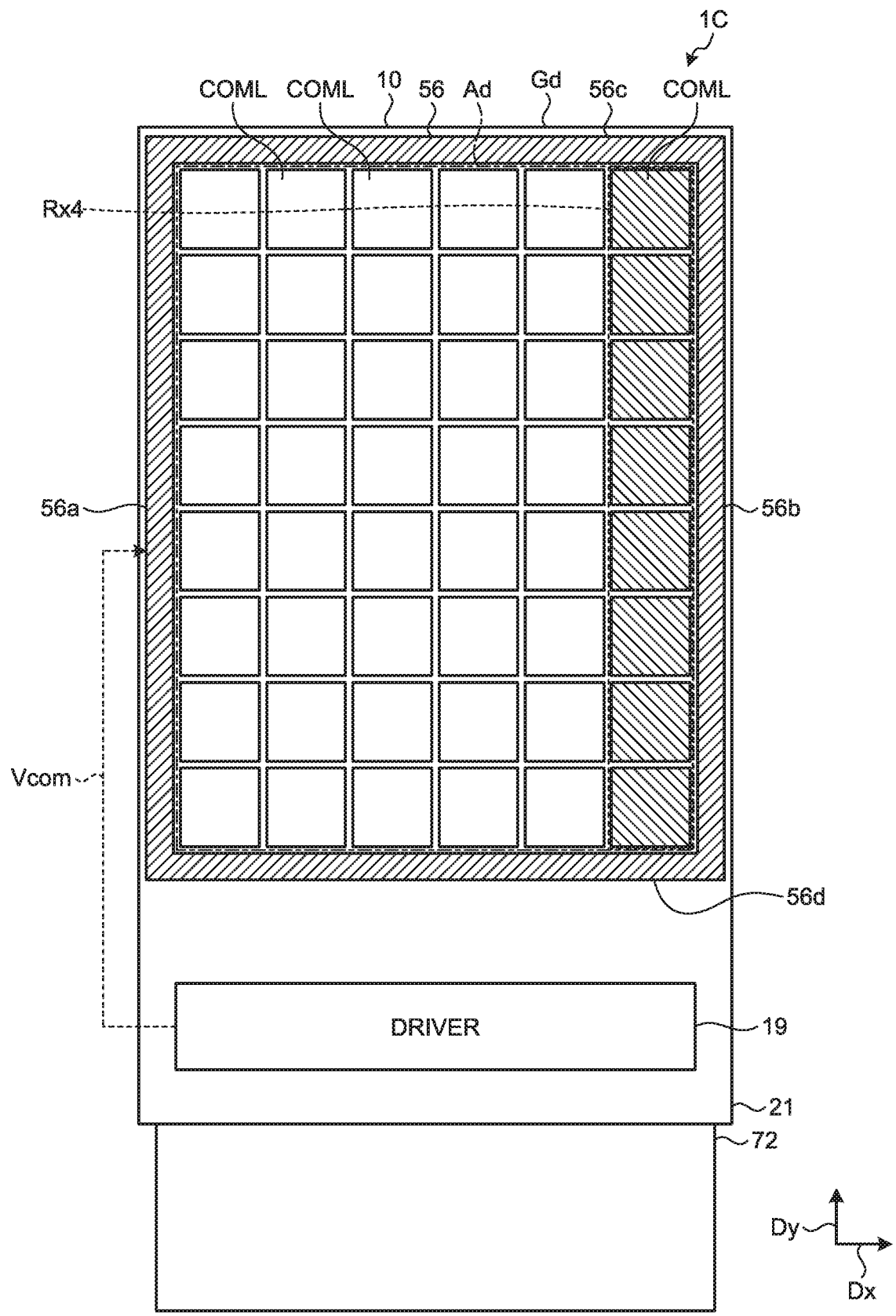
FIG. 25 is a diagram for explaining an exemplary operation in touch detection performed by the display device according to the third embodiment.

Similarly to the second embodiment, the display device 1C according to the present embodiment performs touch detection on the peripheral region Gd by the mutual capacitance method. FIGS. 23 to 25 are diagrams for explaining an exemplary operation in touch detection performed by the display device according to the third embodiment. The display device 1C according to the present embodiment performs touch detection on the peripheral region Gd based on changes in capacitance between the second electrode 56 and the first electrodes COML. Specifically, as illustrated in FIG. 23, the first electrode driver 14 supplies the drive signals Vcom to the second electrode 56.

The controller 11 (refer to FIG. 1) selects a plurality of first electrodes COML disposed side by side with the third region 56c out of the first electrodes COML as a detection target. The first electrodes COML disposed side by side with the third region 56c and arrayed in the first direction Dx are referred to as the detection electrode block Rx1. In other words, the first electrodes COML in the detection electrode block Rx1 are disposed side by side with the third region 56c and arrayed in the longitudinal direction of the third region 56c. The controller 11 (refer to FIG. 1) selects a plurality of first electrodes COML disposed side by side with the fourth region 56d out of the first electrodes COML as a detection target. The first electrodes COML disposed side by side with the fourth region 56d and arrayed in the first direction Dx are referred to as the detection electrode block Rx2. In other words, the first electrodes COML in the detection electrode block Rx2 are disposed side by side with the fourth region 56d and arrayed in the longitudinal direction of the fourth region 56d.

When the drive signal Vcom is supplied to the second electrode 56, the first electrodes COML in the detection electrode block Rx1 output the sensor output signals corresponding to changes in capacitance between the third region 56c and the first electrodes COML to the AFE 48. Simultaneously, the first electrodes COML in the detection electrode block Rx2 output the sensor output signals corresponding to changes in capacitance between the fourth region 56d and the first electrodes COML to the AFE 48 (refer to FIG. 1). As described above, the first electrodes COML in the detection electrode blocks Rx1 and Rx2 serve as detection electrodes. Consequently, the display device 1C can detect the position of an object to be detected in a region along the short sides of the peripheral region Gd even in a case of the second electrode 56 having a frame shape. As described above, the display device 1C performs touch detection on the peripheral region Gd provided with the third region 56c and the fourth region 56d by the mutual capacitance method.

In this case, the number of first electrodes COML included in the detection electrode blocks Rx1 and Rx2 is determined depending on the number of channels in the AFE 48. In the example illustrated in FIG. 23, eight first electrodes COML are simultaneously coupled to the AFE 48 in the same detection period. The number of first electrodes COML is not limited thereto, and seven or less or nine or more first electrodes COML may be coupled to the AFE 48.

As illustrated in FIG. 24, the first electrode driver 14 supplies the drive signal Vcom to the second electrode 56. The controller 11 (refer to FIG. 1) selects a plurality of first electrodes COML disposed side by side with the first region 56a out of the first electrodes COML as a detection target. The first electrodes COML disposed side by side with the first region 56a and arrayed in the second direction Dy are referred to as the detection electrode block Rx3.

The detection electrode block Rx3 outputs the sensor output signals corresponding to changes in capacitance between the first region 56a and the first electrodes COML to the AFE 48. The display device 1C thus performs touch detection on the peripheral region Gd provided with the first region 56a. In the example illustrated in FIG. 24, eight first electrodes COML arrayed in the second direction Dy are simultaneously coupled to the AFE 48 in the same detection period.

As illustrated in FIG. 25, the first electrode driver 14 supplies the drive signal Vcom to the second electrode 56. The controller 11 (refer to FIG. 1) selects a plurality of first electrodes COML disposed side by side with the second region 56b out of the first electrodes COML as a detection target. The first electrodes COML disposed side by side with the second region 56b and arrayed in the second direction Dy are referred to as the detection electrode block Rx4.

The detection electrode block Rx4 outputs the sensor output signals corresponding to changes in capacitance between the second region 56b and the first electrodes COML to the AFE 48. The display device 1C thus performs touch detection on the peripheral region Gd provided with the second region 56b. Also in the example illustrated in FIG. 25, eight first electrodes COML arrayed in the second direction Dy are simultaneously coupled to the AFE 48 in the same detection period.

As described above, the first electrodes COML disposed side by side with the second electrode 56 serve as the detection electrode blocks Rx1, Rx2, Rx3, and Rx4 including a predetermined number of first electrodes COML. The first electrode driver 14 supplies the drive signals Vcom to the second electrode 56. The first electrodes COML output the sensor output signals corresponding to the capacitance changes to the AFE 48 from each of the detection electrode blocks Rx1, Rx2, Rx3, and Rx4. The display device 1C thus performs touch detection on the peripheral region Gd by the mutual capacitance method. In other words, the second electrode 56 according to the present embodiment serves as a drive electrode, and the first electrodes COML in the detection electrode blocks Rx1, Rx2, Rx3, and Rx4 serve as detection electrodes. By performing the detection operation described above, the display device 1C can accurately detect the position of an object to be detected in the peripheral region Gd.

The present embodiment includes one second electrode 56 in the peripheral region Gd. With this configuration, the present embodiment requires a smaller number of wires 28A that couple the second electrode 56 to the driver IC 19 than the configuration according to the first and the second embodiments. As a result, the driver IC 19 requires a smaller number of terminals. The present embodiment does not require any circuit that scans the second electrode 56.

Fourth Embodiment

Figure 26:
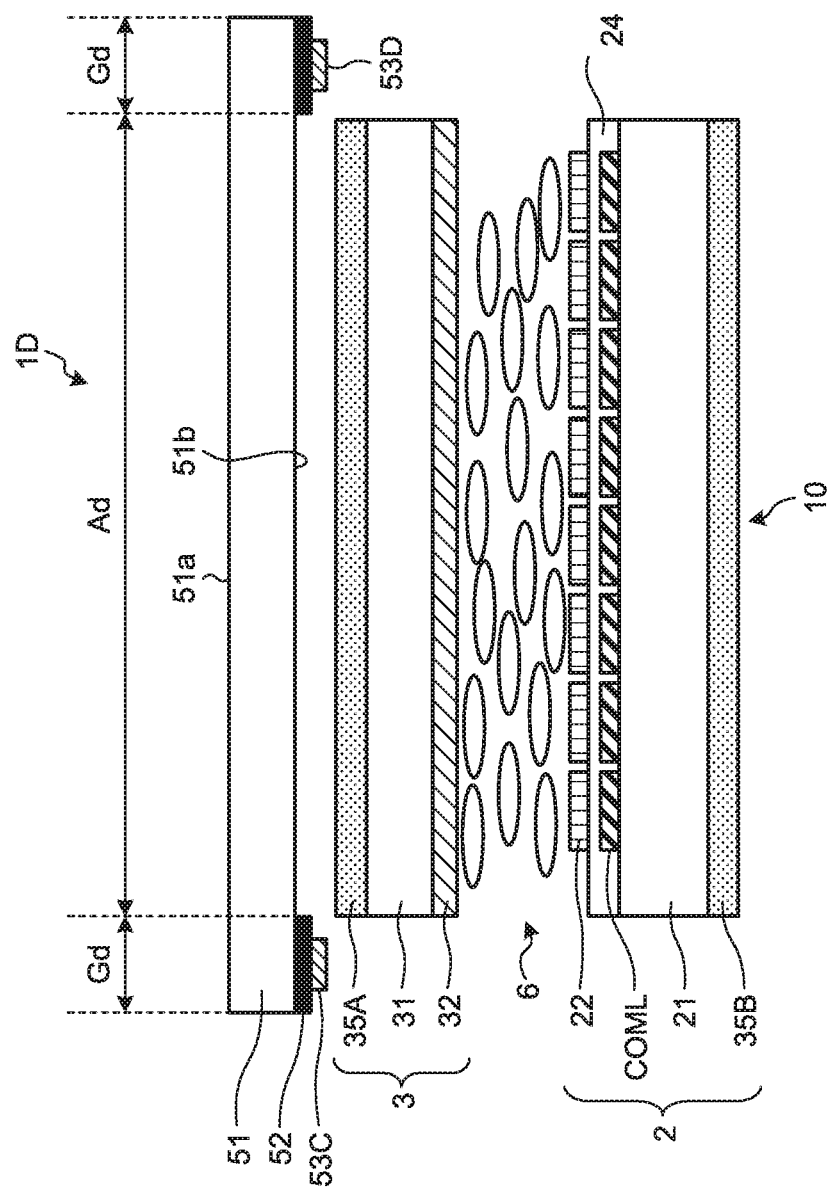
FIG. 26 is a sectional view of a schematic sectional structure of the display device according to a fourth embodiment of the present disclosure.
Figure 27:
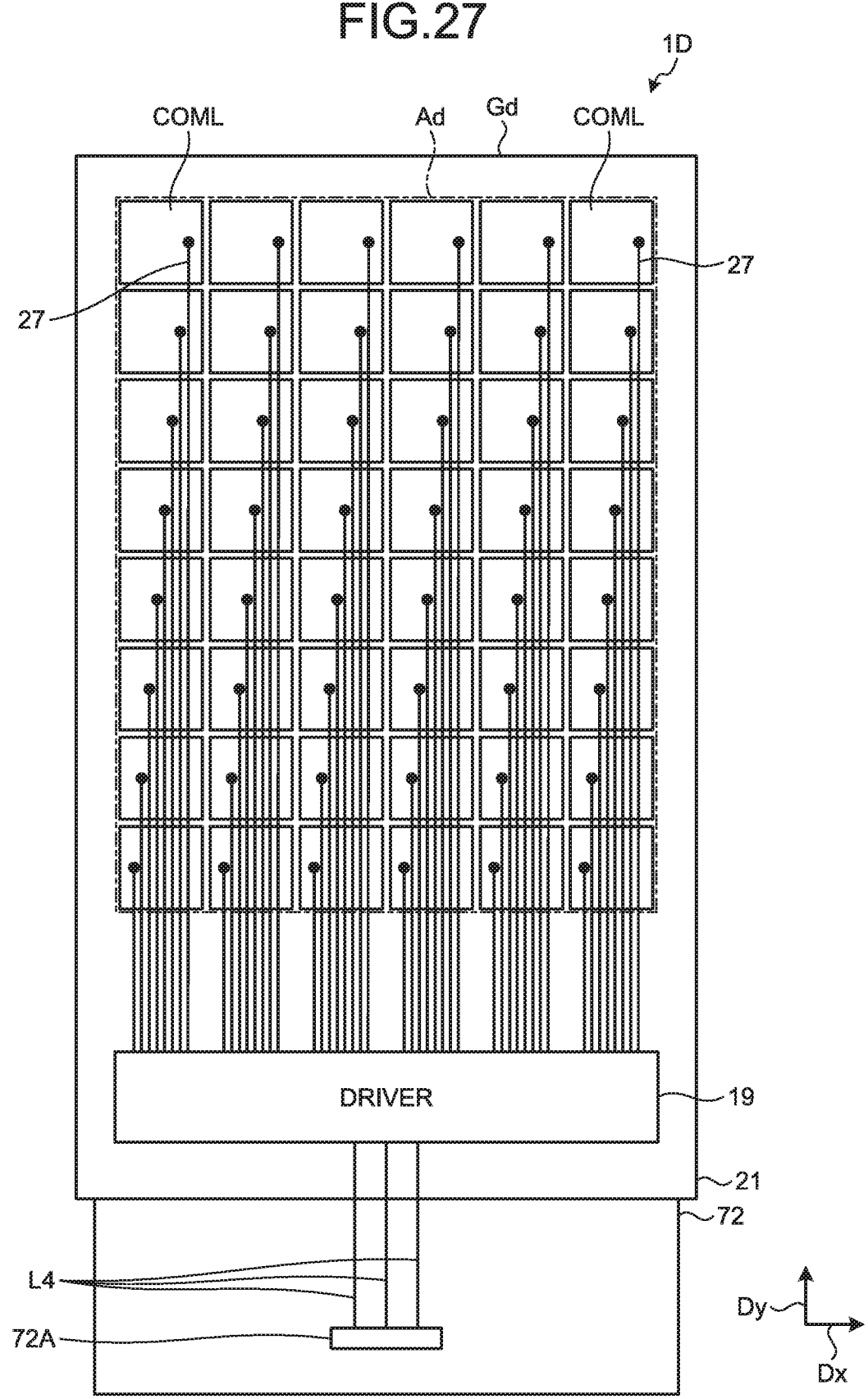
FIG. 27 is a plan view of the first substrate according to the fourth embodiment.
Figure 28:
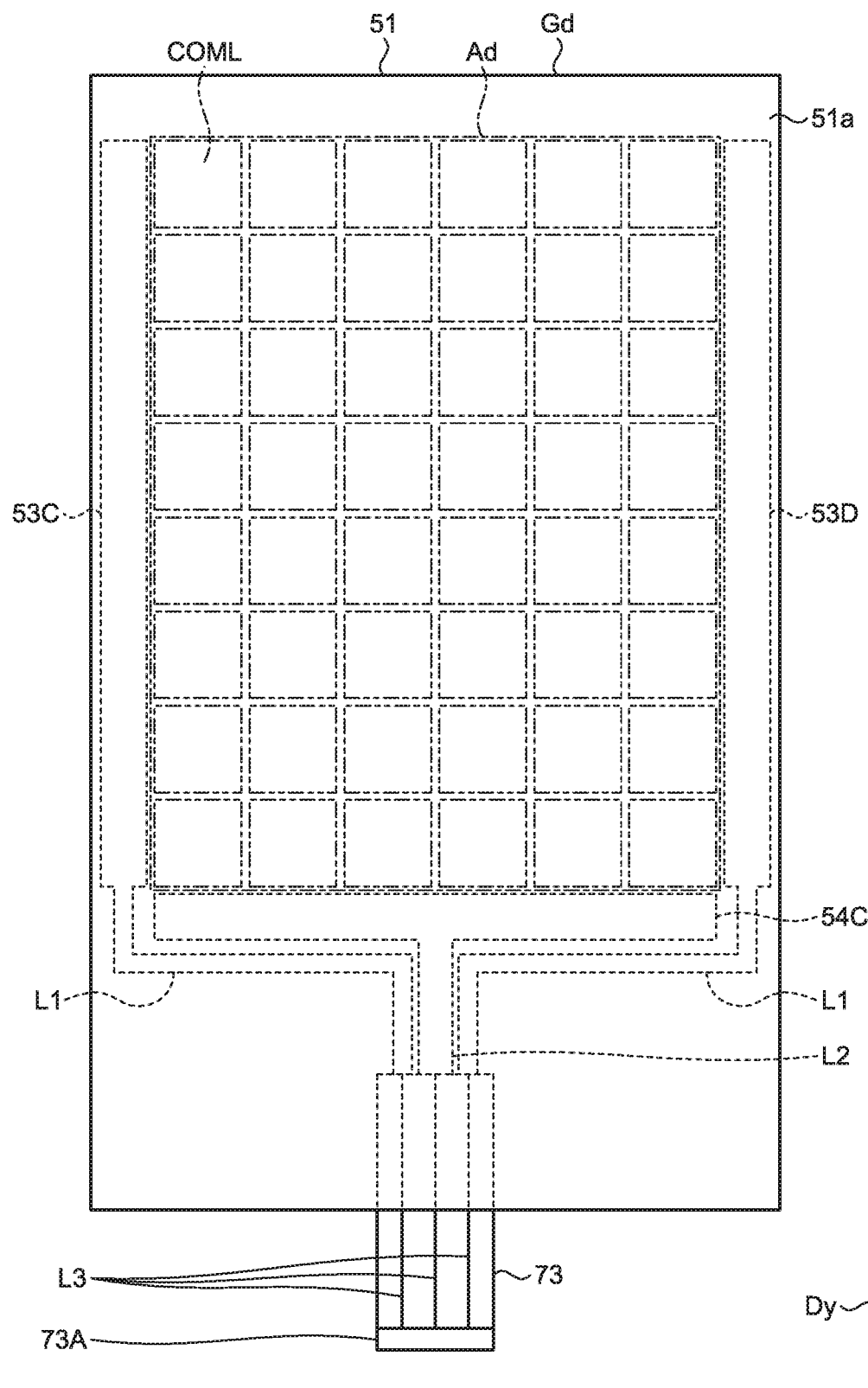
FIG. 28 is a plan view of a cover substrate according to the fourth embodiment.

FIG. 26 is a sectional view of a schematic sectional structure of the display device according to a fourth embodiment of the present disclosure. FIG. 27 is a plan view of the first substrate according to the fourth embodiment. FIG. 28 is a plan view of a cover substrate according to the fourth embodiment. As illustrated in FIG. 26, a display device 1D according to the present embodiment includes a cover substrate 51 besides the pixel substrate 2 and the counter substrate 3. The cover substrate 51 is separated from the first substrate 21 in the direction perpendicular to the surface of the first substrate 21. The cover substrate 51 is disposed on the opposite side of the pixel substrate 2 across the counter substrate 3. The cover substrate 51 according to the present embodiment is also referred to as a third substrate.

The cover substrate 51 is a protective member that covers and protects the pixel substrate 2 and the counter substrate 3. The cover substrate 51 may be a glass substrate or a film-like substrate made of a resin material, for example. The cover substrate 51 has a first surface 51a and a second surface 51b opposite to the first surface 51a. The first surface 51a of the cover substrate 51 is a display surface on which an image is displayed and a detection surface with or to which an object to be detected is in contact or in proximity. The second surface 51b of the cover substrate 51 faces the counter substrate 3 and is bonded to the counter substrate 3 with an adhesive layer, which is not illustrated, interposed therebetween.

The cover substrate 51 according to the present embodiment has an outer shape larger than that of the display panel 10 in planar view. The second surface 51b of the cover substrate 51 is provided with a colored layer 52. The colored layer 52 is provided in the peripheral region Gd. The colored layer 52 can prevent various kinds of circuits, such as the gate driver 12 and the source driver 13, and wires from being visually recognized from the outside. The colored layer 52 is a decorative layer made of a resin material or a metal material colored to suppress transmission of light, for example.

Second electrodes 53C and 53D according to the present embodiment are provided under the colored layer 52 on the second surface 51b of the cover substrate 51. In other words, the second electrodes 53C and 53D are provided to a layer different from that of the pixel electrodes 22. The second electrodes 53C and 53D serve as drive electrodes in touch detection on the peripheral region Gd.

The material of the second electrodes 53C and 53D is not limited to a translucent conductive material, such as ITO. The second electrodes 53C and 53D may be a metal layer made of one or more of aluminum (Al), copper (Cu), silver (Ag), molybdenum (Mo), chromium (Cr), and tungsten (W), for example. The second electrodes 53C and 53D may be made of an alloy including one or more of these metal materials or a multilayered body including a plurality of conductive layers made of these materials.

As illustrated in FIG. 27, the second electrodes 53C and 53D are not provided in the peripheral region Gd of the first substrate 21. The first electrodes COML in a matrix (row-column configuration) are provided in the display region Ad of the first substrate 21. The configuration of the first electrodes COML is the same as that according to the second and the third embodiments. In other words, the present embodiment also performs touch detection on the display region Ad by the self-capacitance method. The guard ring described in the third embodiment may be provided in the peripheral region Gd of the first substrate 21.

FIG. 28 is a plan view of the cover substrate 51 viewed from the first surface 51a. The second electrodes 53C and 53D and a second electrode 54C are provided in the peripheral region Gd of the cover substrate 51. A flexible substrate 73 is provided in the peripheral region Gd of the cover substrate 51. The flexible substrate 73 is provided overlapping the flexible substrate 72 illustrated in FIG. 27. Alternatively, the flexible substrate 73 is preferably provided to the same side as the side provided with the flexible substrate 72.

The second electrodes 53C and 53D have a long shape with their long sides extending in the second direction Dy. The second electrode 54C has a long shape with its long side extending in the first direction Dx. The second electrode 53C is provided to one of the long sides of the peripheral region Gd of the cover substrate 51, and the second electrode 53D is provided to the other of the long sides. The second electrode 54C is provided to the short side coupled to the flexible substrate 73 in the peripheral region Gd of the cover substrate 51. The second electrodes 53C, 53D, and 54C are provided not overlapping the first electrodes COML in planar view.

The second electrodes 53C and 53D are electrically coupled to the flexible substrate 73 via wires L1. The second electrode 54C is electrically coupled to the flexible substrate 73 via wires L2. The wires L1 and L2 are coupled to a terminal 73A via wires L3 provided to the flexible substrate 73. The terminal 73A of the flexible substrate 73 is coupled to a terminal 72A of the flexible substrate 72 illustrated in FIG. 27. The terminal 72A is coupled to the driver IC 19 via wires L4 provided to the flexible substrate 72. With this configuration, the second electrodes 53C, 53D, and 54C provided to the cover substrate 51 are electrically coupled to the driver IC 19.

The second electrodes 53C, 53D, and 54C according to the present embodiment also form capacitance between themselves and the first electrodes COML disposed side by side therewith in planar view. Similarly to the second and the third embodiments, the display device 1D according to the present embodiment can perform touch detection on the peripheral region Gd by the mutual capacitance method.

Specifically, in touch detection on the peripheral region Gd, the first electrode driver 14 supplies the drive signals Vcom to the second electrodes 53C, 53D, and 54C simultaneously or in a time-division manner similarly to the example illustrated in FIGS. 19 to 21. The controller 11 (refer to FIG. 1) selects the detection electrode blocks Rx2, Rx3, and Rx4 (refer to FIGS. 19 to 21) out of the first electrodes COML simultaneously or in a time-division manner. The present embodiment includes no second electrode in the peripheral region Gd on the opposite side of the second electrode 54C across the display region Ad. As a result, the detection electrode block Rx1 illustrated in FIG. 19 is not selected as a detection electrode.

The detection electrode blocks Rx2, Rx3, and Rx4 output the sensor output signals corresponding to changes in capacitance between the second electrodes 53C, 53D, 54C, and 56 and the first electrodes COML to the AFE 48. The display device 1D thus can perform touch detection on the peripheral region Gd. The first electrodes COML in the detection electrode blocks Rx2, Rx3, and Rx4 serve as detection electrodes. Consequently, the display device 1D can accurately detect the position of an object to be detected in the peripheral region Gd.

The second electrodes 53C, 53D, and 54C according to the present embodiment are provided to the cover substrate 51. With this configuration, the present embodiment can make the peripheral region Gd of the first substrate 21 narrower. Furthermore, the second electrodes 53C, 53D, and 54C can have a larger area than those of the second and the third embodiments because they are less restricted by the various kinds of wiring and circuits provided to the peripheral region Gd of the first substrate 21. Consequently, the present embodiment can increase the detection sensitivity in touch detection on the peripheral region Gd.

Fifth Embodiment

Figure 29:
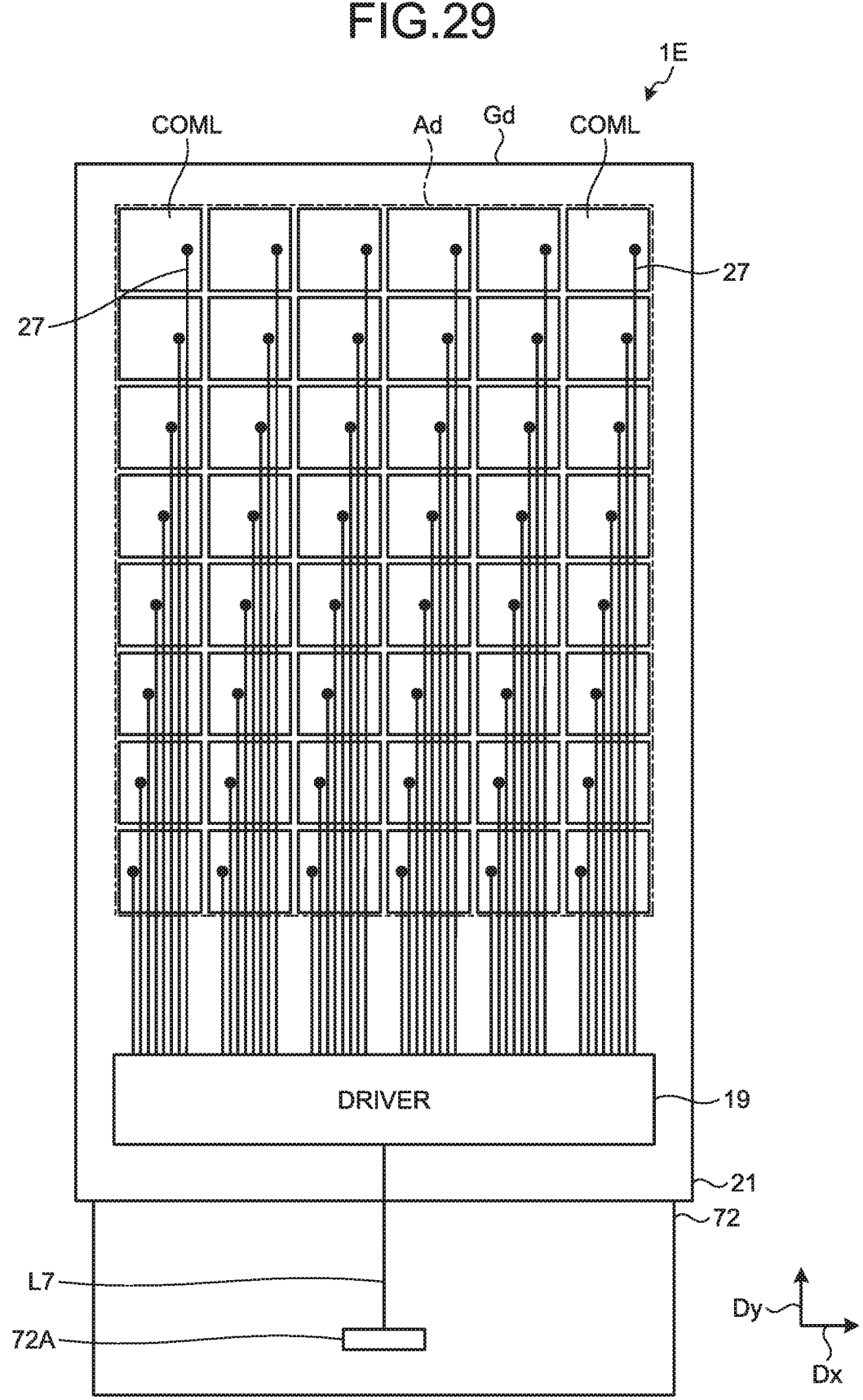
FIG. 29 is a plan view of the first substrate according to a fifth embodiment of the present disclosure.
Figure 30:
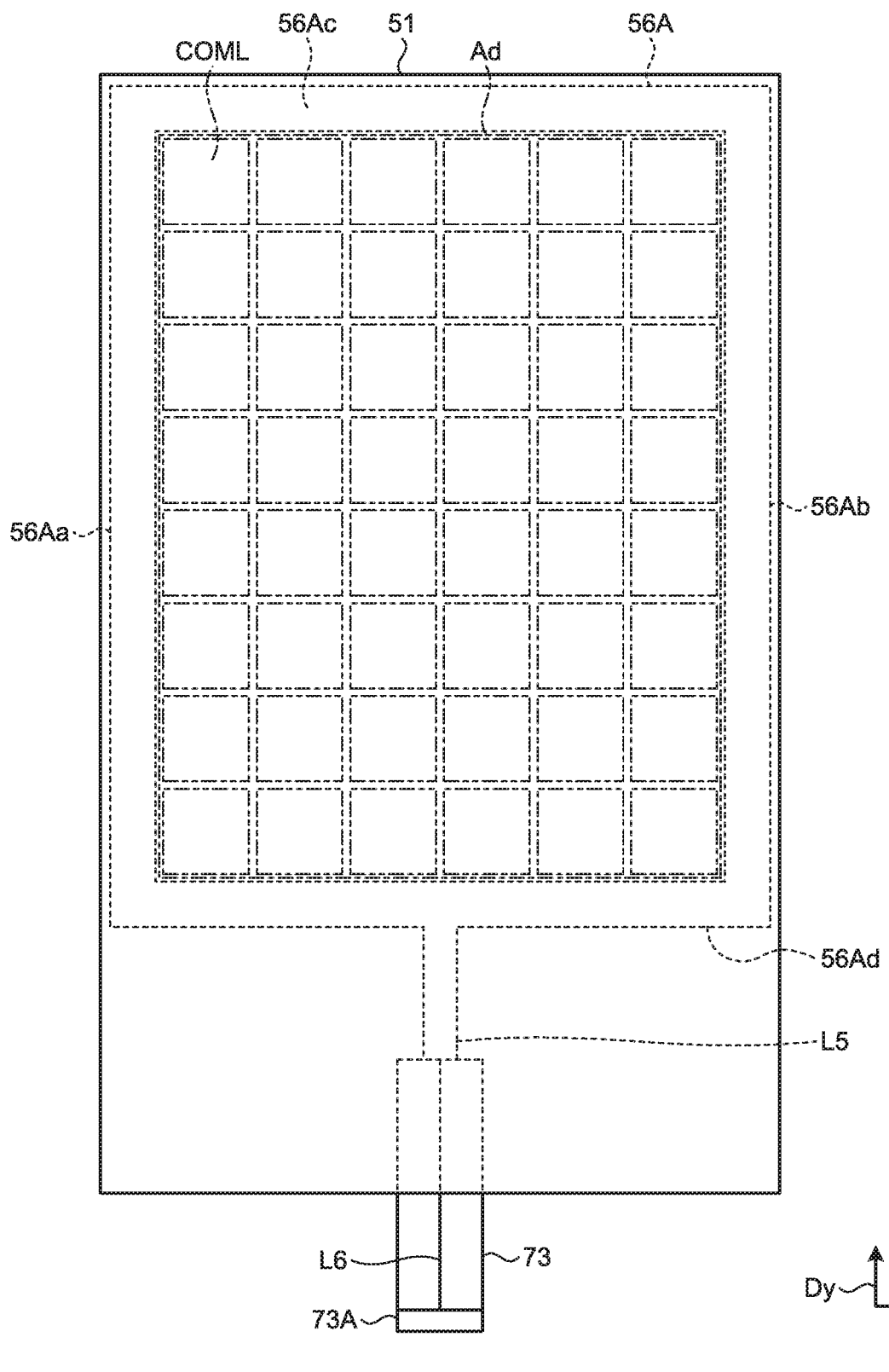
FIG. 30 is a plan view of the cover substrate according to the fifth embodiment.

FIG. 29 is a plan view of the first substrate according to a fifth embodiment of the present disclosure. FIG. 30 is a plan view of the cover substrate according to the fifth embodiment. As illustrated in FIG. 29, no second electrode is provided in the peripheral region Gd of the first substrate 21. The first electrodes COML in a matrix (row-column configuration) are provided in the display region Ad of the first substrate 21. The present embodiment also performs touch detection on the display region Ad by the self-capacitance method. The guard ring described in the third embodiment may be provided in the peripheral region Gd of the first substrate 21.

A display device 1E according to the present embodiment includes a second electrode 56A in the peripheral region Gd of the cover substrate 51. The second electrode 56A has a frame shape similarly to the third embodiment illustrated in FIG. 22. In other words, the second electrode 56A has a first region 56Aa, a second region 56Ab, a third region 56Ac, and a fourth region 56Ad.

The first region 56Aa and the second region 56Ab have a long shape with their long sides extending in the second direction Dy. The third region 56Ac and the fourth region 56Ad have a long shape with their long sides extending in the first direction Dx. The third region 56Ac couples one end of the first region 56Aa and one end of the second region 56Ab. The fourth region 56Ad couples the other end of the first region 56Aa and the other end of the second region 56Ab. As described above, the second electrode 56A has a continuous frame shape. The second electrode 56A surrounds the display region Ad.

The second electrode 56A is electrically coupled to the flexible substrate 73 via wires L5 coupled to the fourth region 56Ad. The wires L5 are coupled to the terminal 73A via a wire L6 provided to the flexible substrate 73. The terminal 73A of the flexible substrate 73 is coupled to the terminal 72A of the flexible substrate 72 illustrated in FIG. 29. The terminal 72A is coupled to the driver IC 19 via a wire L7 provided to the flexible substrate 72. With this configuration, the second electrode 56A provided to the cover substrate 51 is electrically coupled to the driver IC 19.

The second electrode 56A according to the present embodiment also forms capacitance between itself and the first electrodes COML disposed side by side therewith in planar view. The display device 1E according to the present embodiment can perform touch detection on the peripheral region Gd by the mutual capacitance method.

Specifically, in touch detection on the peripheral region Gd, the first electrode driver 14 supplies the drive signals Vcom to the second electrode 56A. Similarly to the example illustrated in FIGS. 19 to 21, the controller 11 (refer to FIG. 1) selects the detection electrode blocks Rx1, Rx2, Rx3, and Rx4 simultaneously or in a time-division manner. The detection electrode blocks Rx1, Rx2, Rx3, and Rx4 output the sensor output signals corresponding to changes in capacitance between the second electrode 56A and the first electrodes COML to the AFE 48. The display device 1E thus can perform touch detection on the peripheral region Gd.

The present embodiment includes one second electrode 56A in the peripheral region Gd of the cover substrate 51. With this configuration, the present embodiment requires a smaller number of wires L5 that couple the second electrode 56A to the flexible substrate 73 than the configuration according to the fourth embodiment. The present embodiment also requires a smaller number of wires L6 and L7 provided to the flexible substrates 73 and 72, respectively. Consequently, the flexible substrates 73 and 72 have a simpler configuration.

Sixth Embodiment

Figure 31:
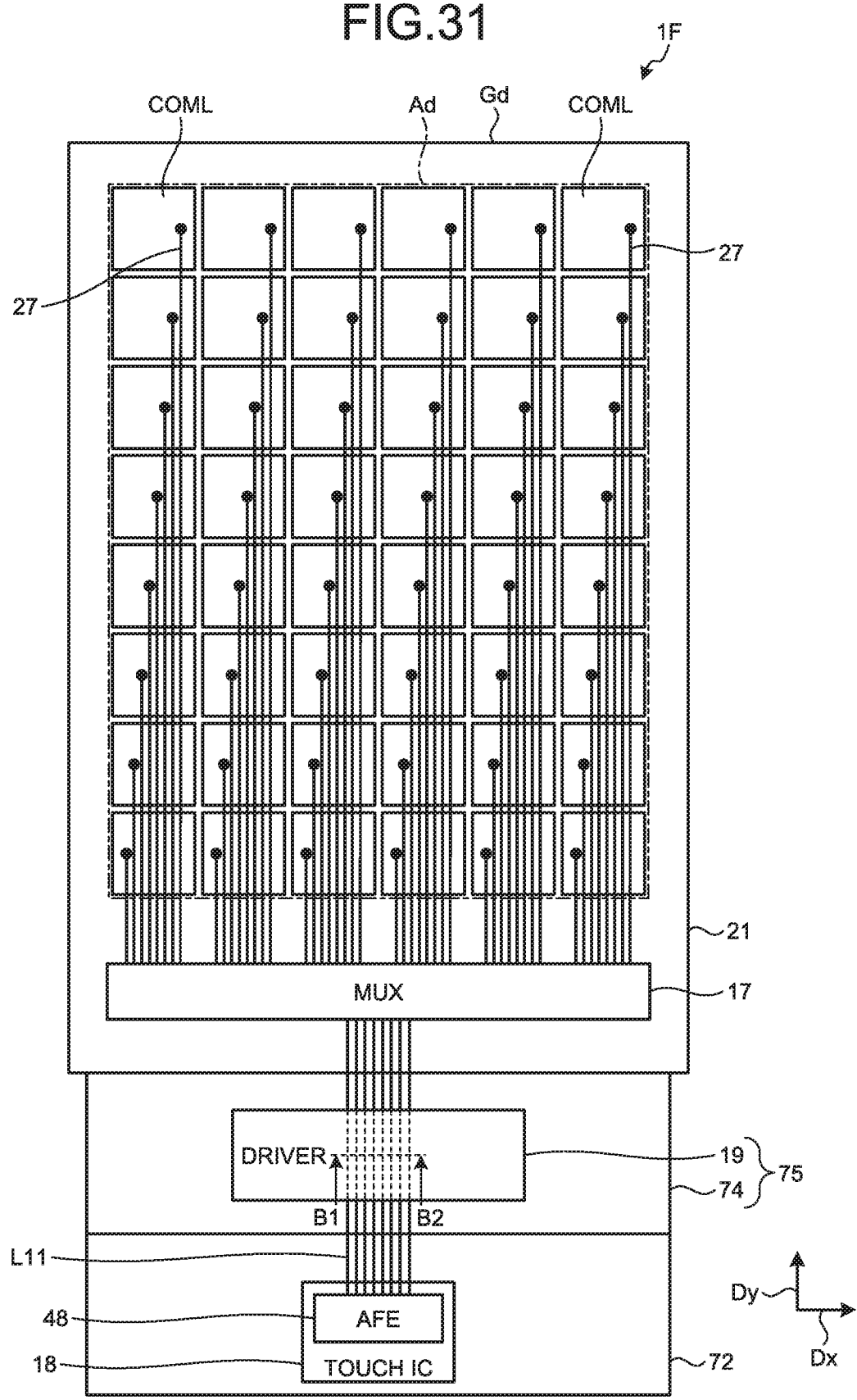
FIG. 31 is a schematic of a coupling configuration between the first electrodes and the analog front end circuit in the display device according to a sixth embodiment of the present disclosure.
Figure 32:
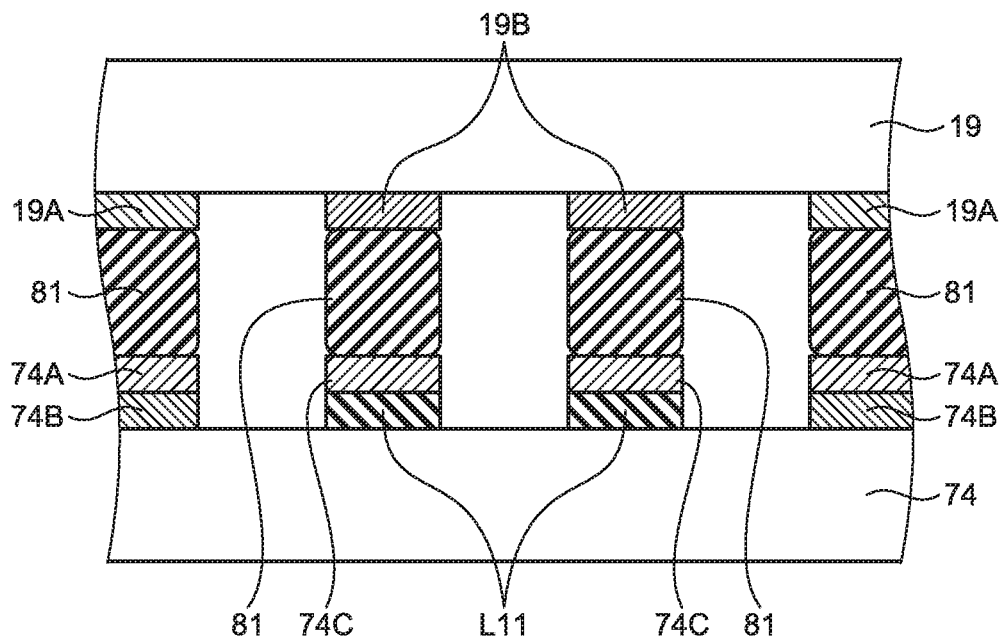
FIG. 32 is a sectional view along line B1-B2 in FIG. 31.

FIG. 31 is a schematic of a coupling configuration between the first electrodes and the analog front end circuit in the display device according to a sixth embodiment of the present disclosure. FIG. 32 is a sectional view along line B1-B2 in FIG. 31. While FIG. 31 illustrates no second electrode in the peripheral region Gd, the present embodiment may include the second electrodes in the first substrate 21 similarly to the first to the third embodiments described above. Alternatively, the present embodiment may include the second electrodes in the cover substrate 51 similarly to the fourth and the fifth embodiments.

As illustrated in FIG. 31, a display device 1F according to the present embodiment includes the COF 75 coupled to the first substrate 21. The flexible substrate 72 is coupled to the COF 75 on the opposite side of the first substrate 21. The COF 75 includes the film-like substrate 74 and the driver IC 19. The driver IC 19 is mounted on the substrate 74. The flexible substrate 72 is provided with the touch IC 18. The touch IC 18 includes the AFE 48.

In the display device 1F according to the present embodiment, the wires L11 are provided under the driver IC 19. The wires L11 pass under the driver IC 19 to couple the coupling circuit 17 and the AFE 48.

As illustrated in FIG. 32, the driver IC 19 is mounted on the substrate 74 with coupling members 81 interposed therebetween. The substrate 74 is provided with the wires L11, wires 74B, pads 74A, and pads 74C. The pad 74A is provided on and electrically coupled to the wire 74B. The wires 74B are electrically coupled to the first electrodes COML. The pad 74C is provided on and electrically coupled to the wire L11.

The coupling member 81 is provided between the pad 74A of the substrate 74 and a pad 19A of the driver IC 19. As a result, the driver IC 19 is electrically coupled to the substrate 74. The wire L11 is provided under a dummy pad 19B of the driver IC 19 with the coupling member 81 interposed therebetween. As a result, the wire L11 is provided under the driver IC 19. With this configuration, the wires L11 pass under the driver IC 19 to extend from the coupling circuit 17 to the AFE 48.

Figure 33:
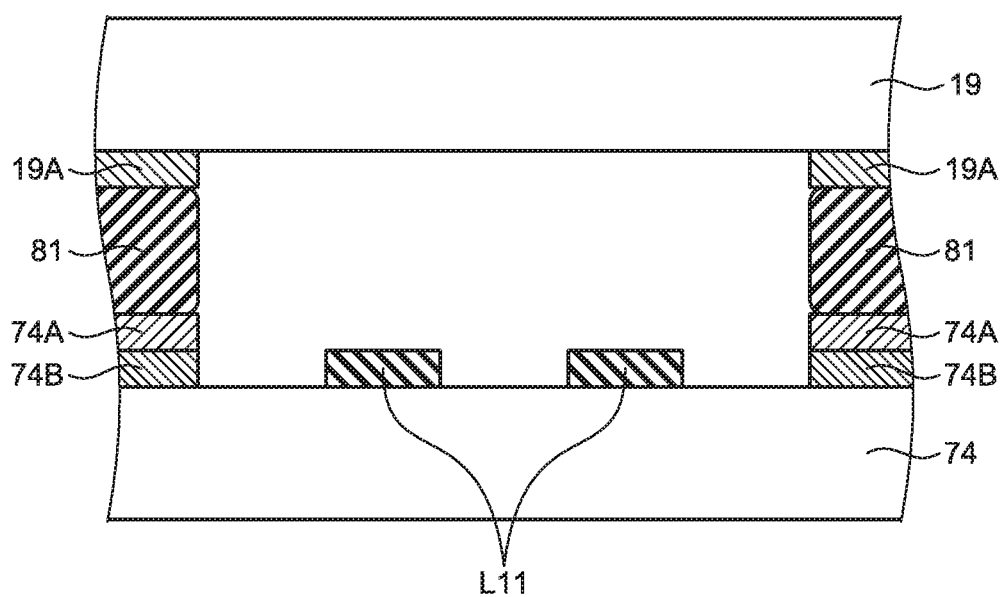
FIG. 33 is a sectional view of the display device according to a modification of the sixth embodiment.

FIG. 33 is a sectional view of the display device according to a modification of the sixth embodiment. The driver IC 19 according to the present modification is provided with no dummy pad 19B. The wires L11 are provided between the pads 19A adjacent to each other. Even in this configuration, the wires L11 pass under the driver IC 19 to extend from the coupling circuit 17 to the AFE 48. While the wires L11 are not electrically coupled to the driver IC 19 in FIGS. 32 and 33, the configuration is not limited thereto. The wires L11 may be coupled to the driver IC 19 and electrically coupled to the touch IC 18 via a circuit or wiring of the driver IC 19.

Seventh Embodiment

Figure 34:
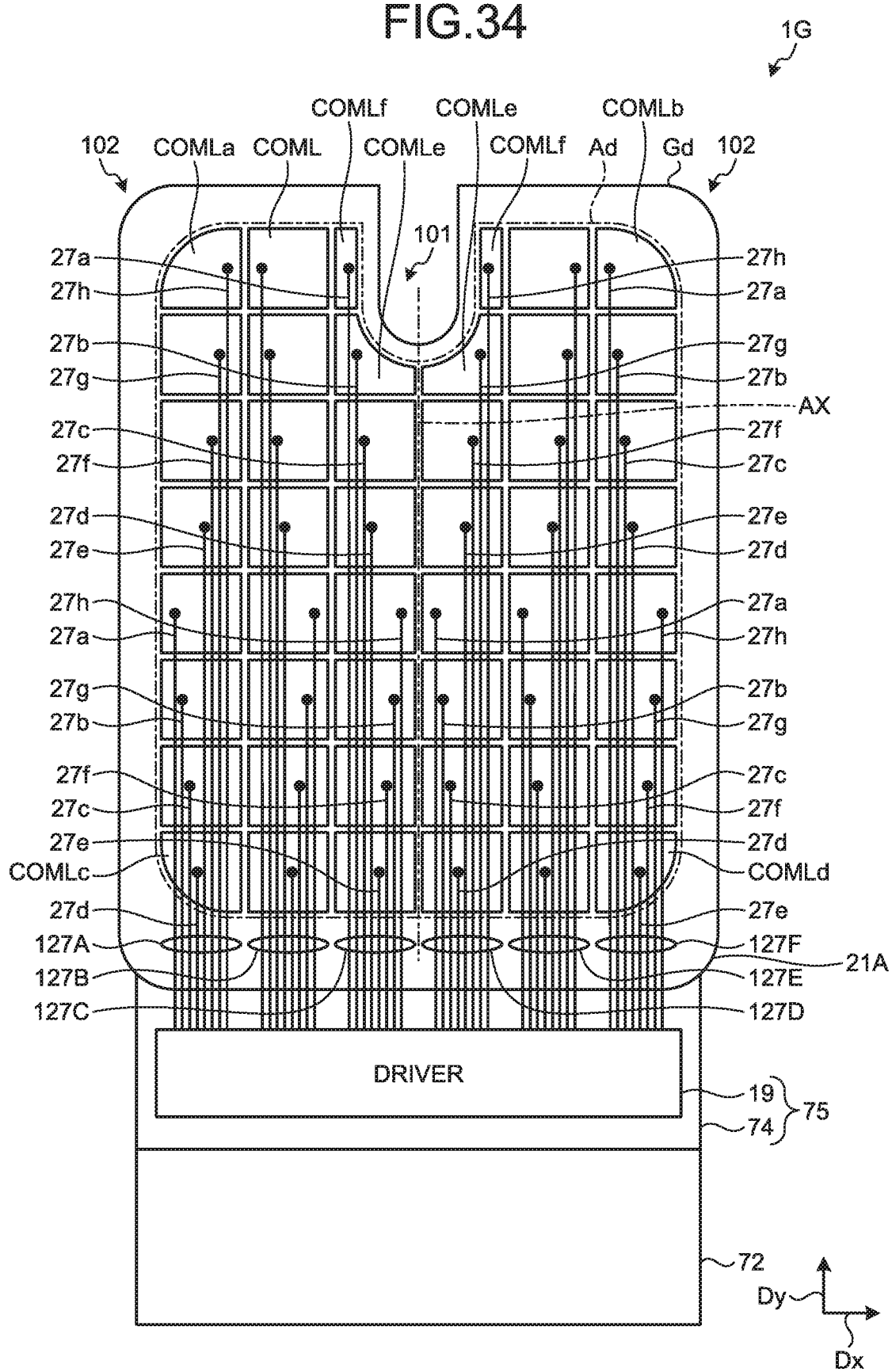
FIG. 34 is a plan view of the first substrate according to a seventh embodiment of the present disclosure.

While the first substrate 21 according to the first to the sixth embodiments has a rectangular shape in planar view, the structure is not limited thereto. FIG. 34 is a plan view of the first substrate according to a seventh embodiment of the present disclosure. A display device 1G according to the present embodiment includes a first substrate 21A having an irregular shape in planar view. Corners 102 of the first substrate 21A have a curved shape. The corner 102 is a portion at which an extension of one side extending in the first direction Dx out of the sides of the first substrate 21A intersects an extension of the other side extending in the second direction Dy. First electrodes COMLa, COMLb, COMLc, and COMLd disposed at the respective corners of the display region Ad have an outer shape including a curve corresponding to the shape of the corners 102.

A recess 101 is formed on the opposite side of the driver IC 19 across the display region Ad out of the sides of the first substrate 21A. The recess 101 bends toward the display region Ad from the outer periphery of the first substrate 21A. First electrodes COMLe and COMLf disposed at the portion where the recess 101 is formed have irregular shapes corresponding to the shape of the recess 101. Specifically, the first electrodes COMLf have a rectangular shape with a width smaller than that of the other first electrodes COML. The first electrodes COMLe have an outer shape including a curve bending inward.

Two first electrodes COMLf are arrayed in the first direction Dx with the recess 101 sandwiched therebetween. Two first electrodes COMLe are arrayed in the first direction Dx with an end of the recess 101 sandwiched therebetween. It may possibly be difficult for the first substrate 21A having such an irregular shape to secure coupling between the wires 27 and the respective first electrodes COML.

As illustrated in FIG. 34, wiring blocks 127A, 127B, 127C, 127D, 127E, and 127F are provided to respective sets of first electrodes COML arrayed in the second direction Dy. The wiring blocks 127A, 127B, 127C, 127D, 127E, and 127F each include wires 27*a*, 27*b*, 27*c*, 27*d*, 27*e*, 27*f*, 27*g*, and 27*h*. The wires 27*a*, 27*b*, 27*c*, 27*d*, 27*e*, 27*f*, 27*g*, and 27*h* are coupled to the respective first electrodes COML arrayed in the second direction Dy. The wires 27*a*, 27*b*, 27*c*, 27*d*, 27*e*, 27*f*, 27*g*, and 27*h* are arrayed in this order in the first direction Dx.

In the following description, the wires 27*a*, 27*b*, 27*c*, 27*d*, 27*e*, 27*f*, 27*g*, and 27*h* are referred to as the wires 27 when they need not be distinguished from one another.

The wiring blocks 127A and 127F are disposed on the outer side in the first direction Dx than the wiring blocks 127B, 127C, 127D, and 127E. In the wiring block 127A, the wire 27*h* is provided at a position farthest from the corner 102 in the first direction Dx, that is, a position farthest from the outer periphery of the first substrate 21A. The wire 27*h* is coupled to the first electrode COMLa farthest from the driver IC 19. The wire 27*h* is disposed closer to the center of the display region Ad than the wire 27*g*.

The wire 27*a* is provided at a position closest to the corner 102 in the first direction Dx, that is, a position closest to the outer periphery of the first substrate 21A. The wire 27*a* is not coupled to the first electrode COMLa or COMLc disposed at both ends out of the first electrodes COML arrayed in the second direction Dy. The wire 27*a* is coupled to the first electrode COML disposed at the center in the second direction Dy.

The wire 27*b* is coupled to the first electrode COML disposed side by side with the first electrode COML coupled to the wire 27*a* on the side close to the driver IC 19 out of the first electrodes COML arrayed in the second direction Dy. The wire 27*c* is coupled to the first electrode COML disposed side by side with the first electrode COML coupled to the wire 27*b* on the side close to the driver IC 19 out of the first electrodes COML arrayed in the second direction Dy. The wire 27*d* is coupled to the first electrode COMLc disposed side by side with the first electrode COML coupled to the wire 27*c* on the side close to the driver IC 19 out of the first electrodes COML arrayed in the second direction Dy. In other words, the wire 27*d* is provided between the wire 27*h* farthest from the outer periphery of the first substrate 21A and the wire 27*a* closest to the outer periphery of the first substrate 21A in the first direction Dx and is coupled to the first electrode COMLc closest to the driver IC 19.

The wire 27*e* is coupled to the first electrode COML disposed side by side with the first electrode COML coupled to the wire 27*a* on the side away from the driver IC 19 out of the first electrodes COML arrayed in the second direction Dy. The wires 27*f*, 27*g*, and 27*h* are coupled in this order to the respective first electrodes COML disposed farther from the driver IC 19.

As illustrated in FIG. 34, in the wiring block 127A, the wire 27*d* is provided between the wire 27*h* farthest from the outer periphery of the first substrate 21A and the wire 27*a* closest to the outer periphery of the first substrate 21A out of the wires 27*a*, 27*b*, 27*c*, 27*d*, 27*e*, 27*f*, 27*g*, and 27*h*. The wire 27*d* is coupled to the first electrode COMLc closest to the driver IC 19. The wires disposed closer to the outer periphery of the first substrate 21A with respect to the wire 27*d*, that is, the wires 27*d*, 27*c*, 27*b*, and 27*a* are coupled in this order to the first electrodes COML disposed farther from the driver IC 19. The wires disposed farther from the outer periphery of the first substrate 21A with respect to the wire 27*d*, that is, the wires 27*d*, 27*e*, 27*f*, 27*g*, and 27*h* are coupled in this order to the first electrodes COML disposed farther from the driver IC 19.

The wires 27*a*, 27*b*, 27*c*, 27*d*, 27*e*, 27*f*, 27*g*, and 27*h* of the wiring block 127F are line-symmetric to those of the wiring block 127A with respect to a symmetry line AX passing through the center of the recess 101 in the first direction Dx and extending in the second direction Dy. In the wiring block 127F, the wire 27*a* is coupled to the first electrode COMLb farthest from the driver IC 19. The wire 27*h* is coupled not to the first electrode COMLb nor COMLd but to the first electrode COML disposed at the center in the second direction Dy. The wire 27*e* between the wires 27*a* and 27*h* is coupled to the first electrode COMLd. This configuration can secure coupling between the wires 27 and the first electrodes COMLa, COMLb, COMLc, and COMLd disposed at the respective corners of the display region Ad.

The wiring block 127B is coupled to the first electrodes COML line-symmetrically to the wiring block 127A. The wiring block 127E is coupled to the first electrodes COML line-symmetrically to the wiring block 127F.

The wiring block 127C is coupled to the first electrodes COML in the same pattern as that of the wiring block 127B. The wiring blocks 127C and 127D disposed near the recess 101 are line-symmetric to each other with respect to the symmetry line AX passing through the center of the recess 101 in the first direction Dx and extending in the second direction Dy. Specifically, the wire 27*a* of the wiring block 127C and the wire 27*h* of the wiring block 127D are disposed side by side with the recess 101 sandwiched therebetween. The wire 27*a* of the wiring block 127C and the wire 27*h* of the wiring block 127D are coupled to the respective first electrodes COMLf farthest from the driver IC 19. The wire 27*b* of the wiring block 127C and the wire 27*g* of the wiring block 127D are disposed near the end of the recess 101 and coupled to the respective first electrodes COMLe.

The wire 27*c* of the wiring block 127C and the wire 27*f* of the wiring block 127D are coupled to the respective first electrode COML disposed side by side with the first electrodes COMLe on the side close to the driver IC 19. The wire 27*d* of the wiring block 127C and the wire 27*e* of the wiring block 127D are coupled to the respective first electrode COML disposed side by side with the first electrodes COML coupled to the wire 27*c* of the wiring block 127C and the wire 27*f* of the wiring block 127D on the side close to the driver IC 19.

The wire 27*e* of the wiring block 127C and the wire 27*d* of the wiring block 127D are coupled to the respective first electrodes COML closest to the driver IC 19. The wires 27*f*, 27*g*, and 27*h* of the wiring block 127C are coupled in this order to the respective first electrodes COML disposed farther from the driver IC 19. The wires 27*c*, 27*b*, and 27*a* of the wiring block 127D are coupled in this order to the respective first electrodes COML disposed farther from the driver IC 19.

As described above, at least a pair of first electrodes (e.g., the first electrodes COMLe) out of the first electrodes COML is disposed side by side in the first direction Dx across the symmetry line AX extending in the second direction Dy passing through the recess 101 and intersecting the first direction Dx. The wire (e.g., the wire 27*b*) coupled to one of the pair of first electrodes COMLe is disposed line-symmetrically to the wire (e.g., the wire 27g) coupled to the other thereof with respect to the symmetry line AX. The wires 27 of the wiring block 127C coupled to the respective first electrodes COML arrayed in the second direction Dy are disposed line-symmetrically, with respect to the symmetry line AX, to those of the wiring block 127D coupled to the respective first electrodes COML disposed side by side with the first electrodes COML corresponding to the wiring block 127C in the first direction Dx. This configuration can secure coupling between the wires 27 and the first electrodes COMLe and COMLf having irregular shapes corresponding to the shape of the recess 101.

Figure 35:
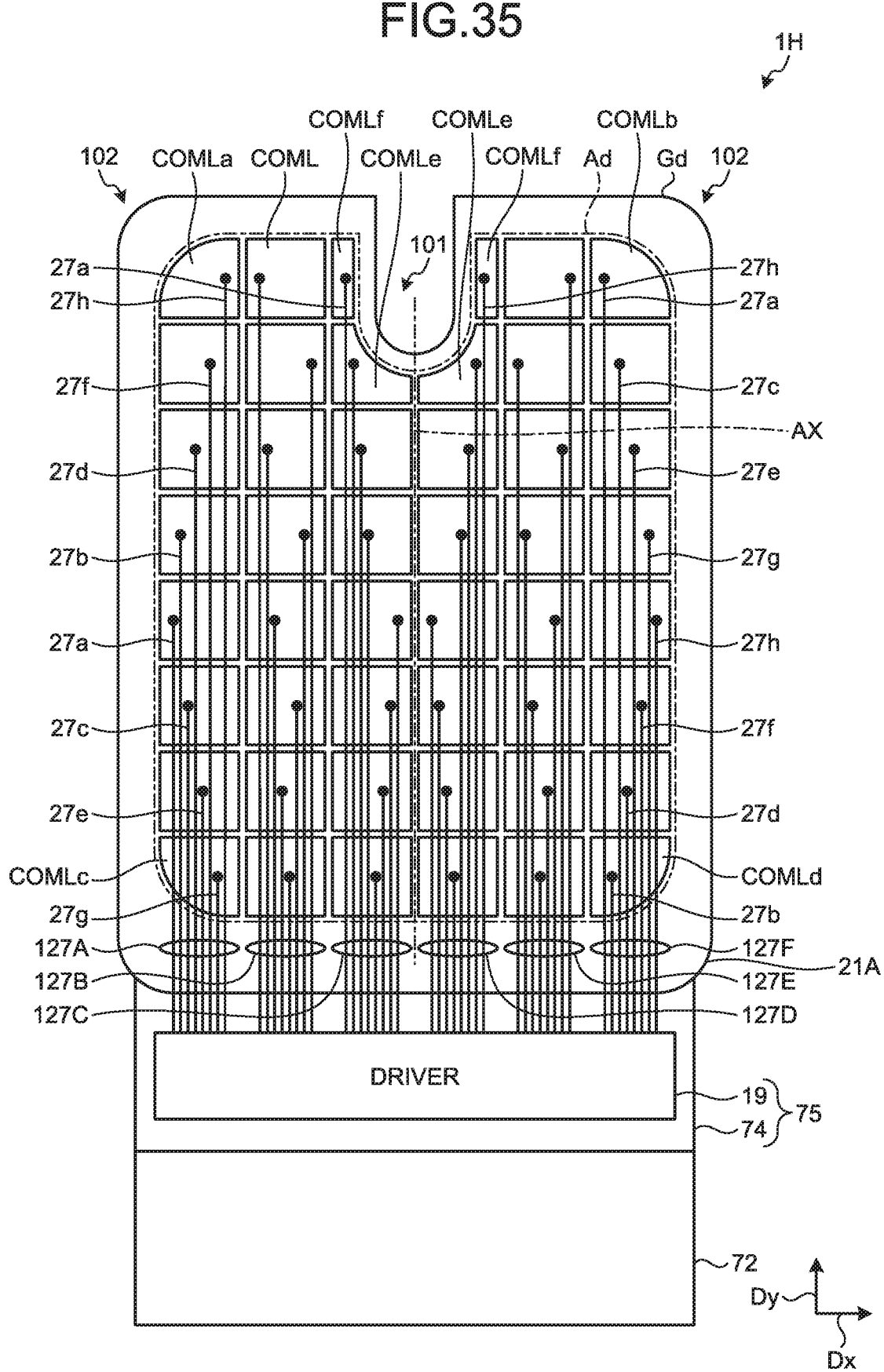
FIG. 35 is a plan view of the first substrate according to a first modification of the seventh embodiment.

The wiring patterns in the wiring blocks 127A, 127B, 127C, 127D, 127E, and 127F are not limited to those illustrated in FIG. 34. FIG. 35 is a plan view of the first substrate according to a first modification of the seventh embodiment.

As illustrated in FIG. 35, in a display device 1H according to the present modification, the shape of the first substrate 21A is the same as that illustrated in FIG. 34. In other words, the first substrate 21A has the corners 102 having a curved shape and the recess 101 formed on one side of the outer periphery.

In the wiring block 127A, the wire 27h is provided at a position farthest from the corner 102 in the first direction Dx, that is, a position farthest from the outer periphery of the first substrate 21A. The wire 27h is coupled to the first electrode COMLa farthest from the driver IC 19. The wire 27g provided side by side with the wire 27h in the first direction Dx is coupled to the first electrode COMLc closest to the driver IC 19.

The wire 27f provided side by side with the wire 27g is coupled to the first electrode COML disposed closer to the driver IC 19 than the first electrode COMLa is. The wire 27e provided side by side with the wire 27f is coupled to the first electrode COML disposed farther from the driver IC 19 than the first electrode COMLc is. The wire 27d provided side by side with the wire 27e is coupled to the first electrode COML disposed closer to the driver IC 19 than the first electrode COML coupled to the wire 27f is. The wire 27c provided side by side with the wire 27d is coupled to the first electrode COML disposed farther from the driver IC 19 than the first electrode COML coupled to the wire 27e is. The wire 27b provided side by side with the wire 27c is coupled to the first electrode COML disposed closer to the driver IC 19 than the first electrode COML coupled to the wire 27d is. The wire 27a is provided at a position closest to the corner 102, that is, a position closest to the outer periphery of the first substrate 21A. The wire 27a is coupled to the first electrode COML disposed at the center other than the first electrodes COML disposed at both ends out of the first electrodes COML arrayed in the second direction Dy. As described above, the wires 27h, 27g, 27f, 27e, 27d, 27c, 27b, and 27a are alternately coupled to the first electrodes COML in this order and converge to the first electrode COML disposed at the center. Also in the present modification, the wire 27g disposed between the wires 27a and 27h is coupled to the first electrode COMLc closest to the driver IC 19 out of the first electrodes COML arrayed in the second direction Dy.

The wires 27a, 27b, 27c, 27d, 27e, 27f, 27g, and 27h of the wiring block 127F are coupled to the respective first electrodes COML line-symmetrically to those of the wiring block 127A. This configuration can secure coupling between the wires 27 and the first electrodes COMLa, COMLb, COMLc, and COMLd disposed at the respective corners of the display region Ad.

Also in the present modification, the wiring blocks 127C and 127D disposed at the position corresponding to the recess 101 are line-symmetric to each other with respect to the symmetry line AX passing through the center of the recess 101 in the first direction Dx and extending in the second direction Dy. This configuration can secure coupling between the wires 27 and the first electrodes COMLe and COMLf having irregular shapes corresponding to the shape of the recess 101.

The wiring block 127B according to the present modification is coupled to the first electrodes asymmetrically to the wiring block 127A. The wiring block 127B is coupled to the first electrodes COML line-symmetrically to the wiring block 127E. The wiring block 127B may have the wiring pattern described above.

In FIG. 35, only the wiring blocks disposed on the outermost side in the first direction Dx, that is, only the wiring blocks 127A and 127F have the wiring pattern in which the wires 27 are alternately coupled to the first electrodes COML and converge to the first electrode COML disposed at the center. The configuration is not limited thereto. The wiring blocks 127A and 127B in FIG. 35, for example, may be defined as typical patterns of the wires 27, and they may be alternately provided. Alternatively, a plurality of wiring blocks 127B and one wiring block 127A may be arrayed in the first direction Dx. Still alternatively, one wiring block 127B and a plurality of wiring blocks 127A may be arrayed in the first direction Dx.

Figure 36:
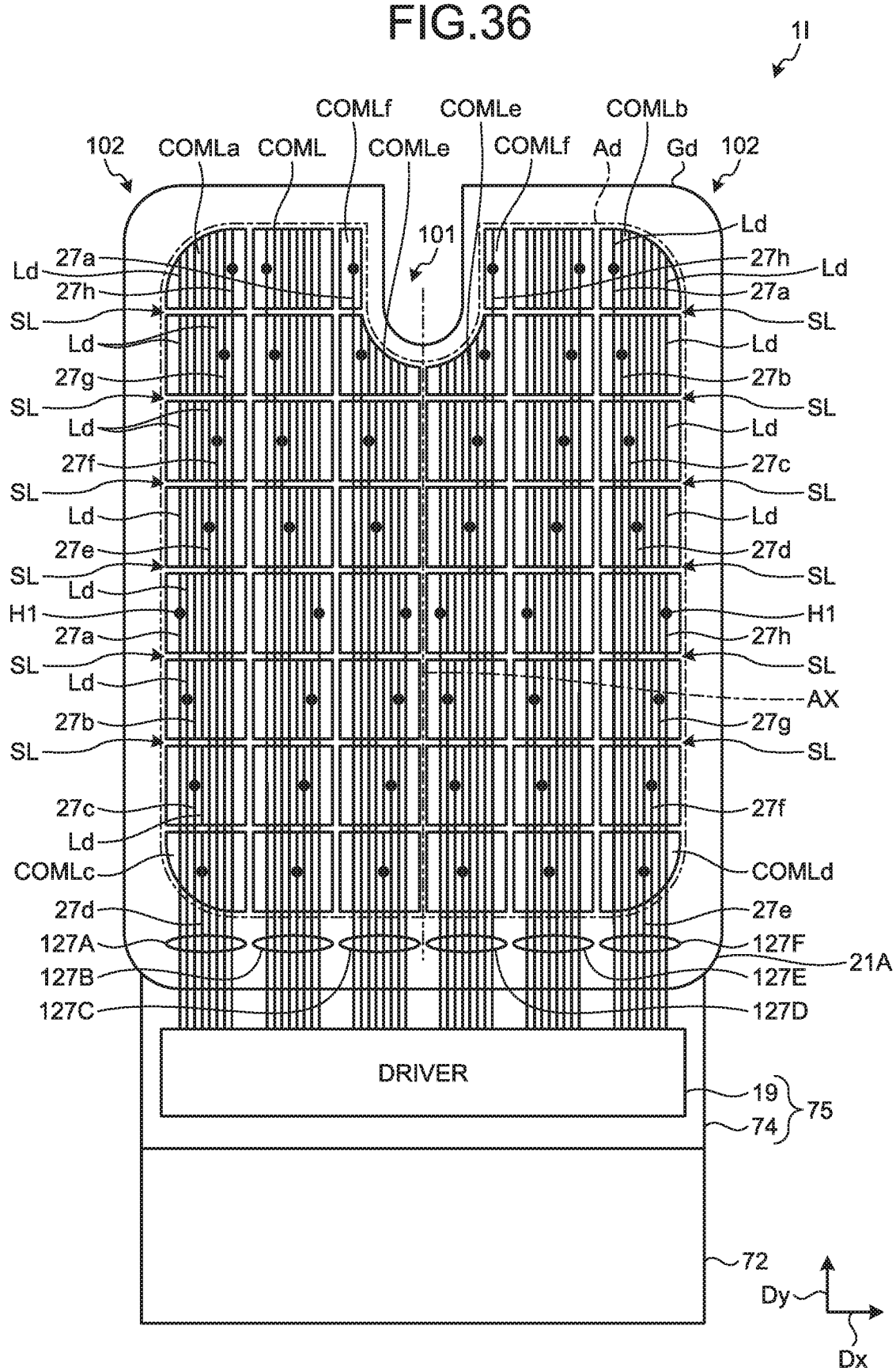
FIG. 36 is a plan view of the first substrate according to a second modification of the seventh embodiment.
Figure 37:
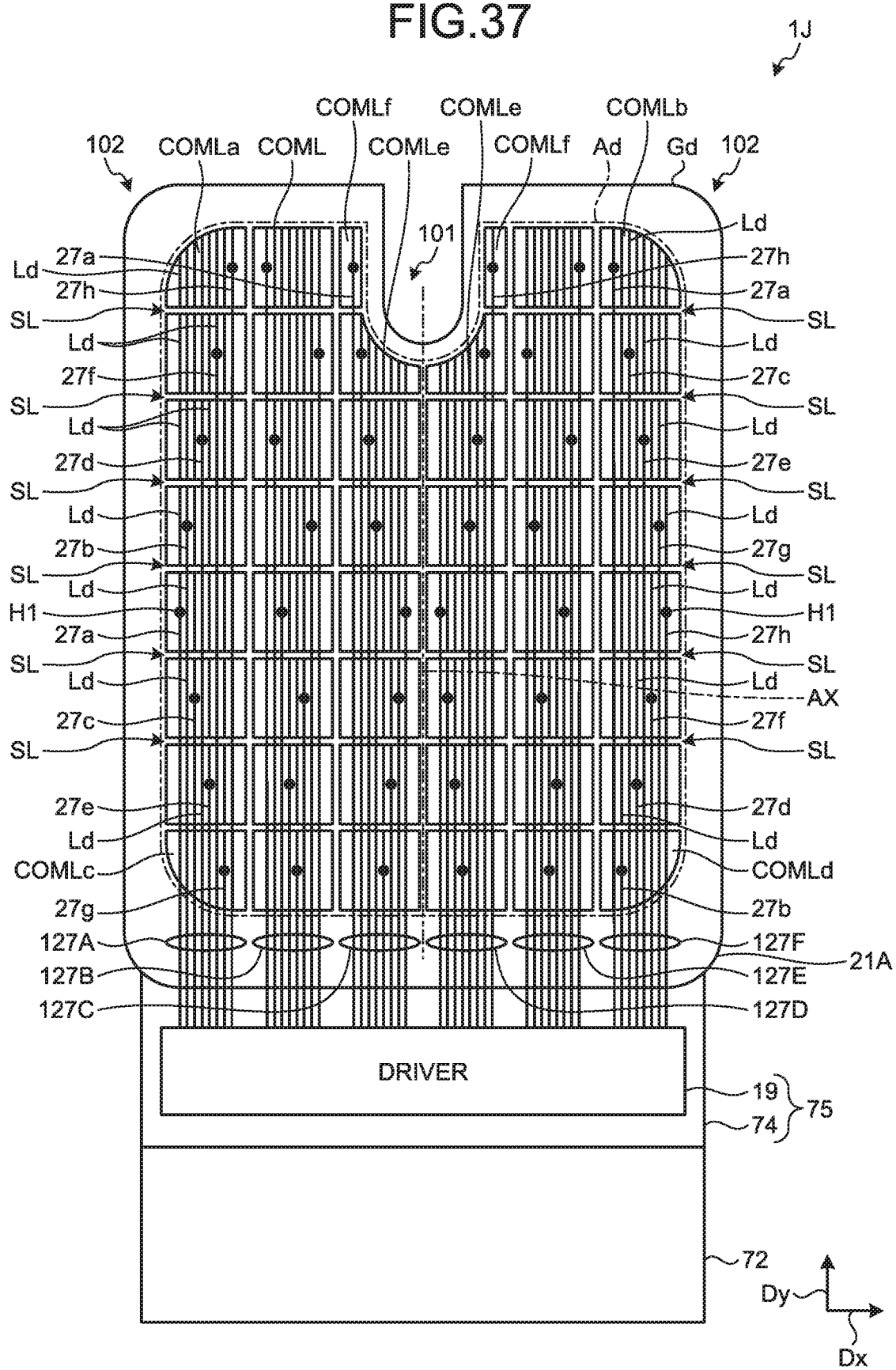
FIG. 37 is a plan view of the first substrate according to a third modification of the seventh embodiment.

FIG. 36 is a plan view of the first substrate according to a second modification of the seventh embodiment. FIG. 37 is a plan view of the first substrate according to a third modification of the seventh embodiment. In a display device 1I according to the second modification illustrated in FIG. 36, the wiring patterns of the wiring blocks 127A to 127F are the same as those illustrated in FIG. 34. In a display device 1J according to the third modification illustrated in FIG. 37, the wiring patterns of the wiring blocks 127A to 127F are the same as those illustrated in FIG. 35.

The modifications illustrated in FIGS. 36 and 37 are different from the display device 1G in FIG. 34 and the display device 1H in FIG. 35 in that dummy wires Ld are provided. As illustrated in FIGS. 36 and 37, the wires 27 are coupled to the first electrodes COML through the respective contact holes H1. The dummy wires Ld extending in a direction parallel to the wires 27 are provided to the first electrodes COML disposed farther from the driver IC 19 than the first electrodes COML coupled to the respective wires 27 are.

The dummy wire Ld is disposed under the first electrode COML. The dummy wire Ld is separated from the wire 27 by a slit SL. A plurality of dummy wires Ld are arrayed in the second direction Dy. In this case, the dummy wires Ld are separated from each other by the slits SL. The dummy wires Ld may be electrically coupled to the respective first electrodes COML disposed overlapping them. In the example illustrated in FIGS. 36 and 37, the width of the slit SL is equal to the space between the first electrodes COML disposed side by side in the second direction Dy.

The dummy wires Ld are made of the same material as that of the wires 27. The dummy wires Ld are disposed with the same width and at the same pitch as those of the wires 27. The dummy wires Ld suppress fluctuations in the light transmittance between the portions provided with the wires 27 and the portions provided with the dummy wires Ld. Consequently, the display devices 1I and 1J can provide high visibility.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the technical scope of the invention.

The display device according to the present aspect may have the following aspects, for example.

(1) A display device comprising:
a substrate;
a plurality of first electrodes disposed in a matrix in a display region of the substrate;
a plurality of second electrodes disposed in a peripheral region on an outside of the display region of the substrate;
a driver configured to supply a drive signal to the first electrodes and the second electrodes; and
a plurality of wires coupled to the respective first electrodes, wherein
the first electrodes are electrically coupled to the driver via the respective wires, and
the first electrodes output detection signals corresponding to self-capacitance changes in the first electrodes, and
the second electrodes output detection signals corresponding to self-capacitance changes in the second electrodes.

(2) The display device according to (1), wherein
the second electrodes are provided along at least one side of the peripheral region, and
an array pitch of the second electrodes is equal to an array pitch of the first electrodes in a direction along one side of the peripheral region.

(3) The display device according to (1) or (2), wherein the second electrodes are provided to four sides of the peripheral region surrounding the first electrodes.

(4) The display device according to any one of (1) to (3), wherein
the first electrodes and the second electrodes are divided into a plurality of detection electrode blocks, and
the driver supplies the drive signal to the detection electrode blocks in a time-division manner.

(5) The display device according to any one of (1) to (4), wherein the first electrodes are provided to a layer different from a layer of the second electrodes.

(6) A display device comprising:
a substrate;
a plurality of first electrodes disposed in a matrix in a display region of the substrate;
a second electrode provided along at least one side of a peripheral region on an outside of the display region;
a driver configured to supply a drive signal to the second electrode; and
a plurality of wires coupled to the respective first electrodes, wherein
the first electrodes are electrically coupled to the driver via the respective wires, and
the first electrodes output detection signals corresponding to capacitance changes between the first electrodes and the second electrode when the drive signal is supplied to the second electrode.

(7) The display device according to (6), wherein
the second electrode is provided continuously along at least one side of the peripheral region, and
the first electrodes are provided side by side with the second electrode and arrayed in a longitudinal direction of the second electrode.

(8) The display device according to (6) or (7), wherein the second electrode is provided to four sides of the peripheral region surrounding the first electrodes.

(9) The display device according to (6) or (7), wherein the second electrode is provided continuously along four sides of the peripheral region.

(10) The display device according to (8) or (9), wherein
the first electrodes arrayed side by side with the second electrode are divided into a plurality of detection electrode blocks, and
the first electrodes in each of the detection electrode blocks output the detection signals.

(11) The display device according to any one of (6) to (10), further comprising:
a cover substrate separated from the substrate in a direction perpendicular to a surface of the substrate, wherein
the second electrode is provided in the peripheral region of the cover substrate.

(12) The display device according to any one of (1) to (11), further comprising a coupling switching circuit configured to switch coupling and cutting off of the first electrodes to and from the driver.

(13) The display device according to any one of (1) to (12), wherein
an outer periphery of the substrate has a corner having a curved shape and where a side extending in a first direction intersects a side extending in a second direction intersecting the first direction in a plane parallel to a surface of the substrate in planar view,
the wires coupled to the respective first electrodes arrayed in the second direction are arrayed in the first direction,
a wire, among the wires, farthest from the outer periphery of the substrate in the first direction is electrically coupled to a first electrode, among the first electrodes, farthest from the driver, and
a wire, among the wires, disposed between a wire, among the wires, closest to the outer periphery of the substrate in the first direction and the wire farthest from the outer periphery of the substrate is electrically coupled to a first electrode, among the first electrodes, closest to the driver.

(14) The display device according to any one of (1) to (13), wherein
an outer periphery of the substrate has a recess recessed toward the display region on a side extending in a first direction in a plane parallel to a surface of the substrate in planar view,
at least a pair of the first electrodes out of the first electrodes are disposed side by side in the first direction across a symmetry line extending in a second direction passing through the recess and intersecting the first direction, and
a wire, among the wires, coupled to a first one of the pair of the first electrodes is disposed line-symmetrically to a wire, among the wires, coupled to a second one of the pair of the first electrodes with respect to the symmetry line.

(15) The display device according to any one of (1) to (14), wherein a dummy wire extending in a direction parallel to the wires is provided to the first electrode disposed farther from the driver than the first electrodes coupled to the respective wires are.

What is claimed is:
1. A display device comprising:
a substrate;
a plurality of first electrodes disposed in a matrix of a first direction and a second direction, in a display region of the substrate;

a plurality of pixel electrodes disposed in a matrix in the display region;

a plurality of second electrodes disposed along at least the second direction in a peripheral region outside the display region;

a driver configured to supply a drive signal to the first electrodes and the second electrodes; and a plurality of first wires coupled to the respective first electrodes, wherein, the first electrodes are arranged at a first pitch in the second direction, the second electrodes are arranged at a second pitch in the second direction, the first pitch of the first electrodes disposed in the display region is equal to the second pitch of the second electrode disposed in the peripheral region in which the pixel electrodes are not disposed, in a third direction perpendicular to a surface of the substrate, the first electrodes are disposed in a first layer that is between the pixel electrodes and the first wires, the second electrodes are provided in a second layer that is different from the first layer, and the second layer is a same layer in which the pixel electrodes are disposed, the first electrodes are electrically coupled to the driver via the respective first wires, the first electrodes output detection signals corresponding to self-capacitance changes in the first electrodes, and the second electrodes output detection signals corresponding to self-capacitance changes in the second electrodes.

2. The display device according to claim 1, wherein the second electrodes are provided to four sides of the peripheral region surrounding the first electrodes.

3. The display device according to claim 1, wherein the first electrodes and the second electrodes are divided into a plurality of detection electrode blocks, and the driver supplies the drive signal to the detection electrode blocks in a time-division manner.

4. The display device according to claim 1, further comprising a coupling switching circuit configured to switch coupling and cutting off of the first electrodes to and from the driver.

5. The display device according to claim 1, wherein an outer periphery of the substrate has a corner having a curved shape and where a side extending in the first direction intersects a side extending in the second direction in a plane parallel to a surface of the substrate in planar view, the first wires coupled to the respective first electrodes arrayed in the second direction are arrayed in the first direction, a wire, among the first wires, farthest from the outer periphery of the substrate in the first direction is electrically coupled to a first electrode, among the first electrodes, farthest from the driver, and a wire, among the first wires, disposed between a wire, among the first wires, closest to the outer periphery of the substrate in the first direction and the wire farthest from the outer periphery of the substrate is electrically coupled to a first electrode, among the first electrodes, closest to the driver.

6. The display device according to claim 1, wherein an outer periphery of the substrate has a recess recessed toward the display region on a side extending in the first direction in a plane parallel to a surface of the substrate in planar view, at least a pair of the first electrodes out of the first electrodes are disposed side by side in the first direction across a symmetry line extending in the second direction passing through the recess and intersecting the first direction, and a wire, among the first wires, coupled to a first one of the pair of the first electrodes is disposed line-symmetrically to a wire, among the first wires, coupled to a second one of the pair of the first electrodes with respect to the symmetry line.

7. The display device according to claim 1, wherein a dummy wire extending in a direction parallel to the first wires is provided to the first electrode disposed farther from the driver than the first electrodes coupled to the respective first wires are.

8. The display device according to claim 1, wherein the first pitch of the first electrodes that are disposed in the display region in the first layer is equal to the second pitch of the second electrodes that are disposed in the peripheral region in the second layer.

9. The display device according to claim 1, further comprises a plurality of second wires coupled to the respective second electrodes, wherein, in the third direction, the first electrodes are disposed in the first layer that is between the second electrodes and the second wires, and that is between the pixels and the first wires.

10. The display device according to claim 1, further comprises a plurality of second wires coupled to the respective second electrodes, wherein, in the third direction, a distance between the first electrodes and the first wires is shorter than a distance between the second electrodes and the second wires, and is shorter than a distance between the pixel electrodes and the first wires.

11. A display device comprising:

a substrate;

a plurality of first electrodes disposed in a matrix of a first direction and a second direction, in a display region of the substrate;

a plurality of second electrodes provided in a peripheral region outside the display region, the second electrodes including a pair of first-second electrodes opposed to each other in the second direction and provided along the first direction, the first electrodes being disposed between the pair of first-second electrodes, and a pair of second-second electrodes opposed to each other in the first direction and provided along the second direction, the first electrodes being disposed between the pair of second-second electrodes;

a driver configured to supply a drive signal to the second electrodes;

a plurality of first wires coupled to the respective first electrodes; and a plurality of second wires coupled to the respective second electrodes, wherein in the second direction, a length of each of the pair of second-second electrodes is greater than a combined length of one column of the first electrodes that are disposed along the second direction in the display region, the first wires extending in the first direction overlap the first electrodes in a third direction perpendicular to a surface of the substrate, one of the second wires that are coupled to one of the pair of first-second electrodes overlaps the first electrodes in the third direction, the first electrodes are electrically coupled to the driver via the respective first wires, and the first electrodes output detection signals corresponding to capacitance changes between the first electrodes and the second electrodes when the drive signal is supplied to the second electrodes.

12. The display device according to claim 11, wherein the first electrodes are provided side by side with the second electrode and arrayed in a longitudinal direction of the second electrode.

13. The display device according to claim 11, wherein the second electrode is provided to four sides of the peripheral region surrounding the first electrodes.

14. The display device according to claim 11, wherein the second electrode is provided continuously along four sides of the peripheral region.

15. The display device according to claim 13, wherein the first electrodes arrayed side by side with the second electrode are divided into a plurality of detection electrode blocks, and the first electrodes in each of the detection electrode blocks output the detection signals.

16. The display device according to claim 11, further comprising:

a cover substrate separated from the substrate in the third direction, wherein the second electrode is provided in the peripheral region of the cover substrate.

17. The display device according to claim 11, wherein the one of the second wires coupled to one of the pair of first-second electrodes extends along the first wires and has a length longest among the first wires and second wires, and one of the second wires coupled to one of the pair of second-second electrodes extends along the first wires and has a length shortest among the first wires and second wires.

\* \* \* \* \*